(12) United States Patent
Kinlen et al.

(10) Patent No.: US 11,884,395 B2
(45) Date of Patent: *Jan. 30, 2024

(54) ELECTRICALLY CONDUCTIVE MATERIALS FOR HEATING AND DEICING AIRFOILS

(71) Applicant: THE BOEING COMPANY, Chicago, IL (US)

(72) Inventors: Patrick J Kinlen, Fenton, MO (US); Kenneth W. Young, Bear, DE (US)

(73) Assignee: THE BOEING COMPANY, Arlington, VA (US)

( * ) Notice: Subject to any disclaimer, the term of this patent is extended or adjusted under 35 U.S.C. 154(b) by 201 days.

This patent is subject to a terminal disclaimer.

(21) Appl. No.: 17/493,223

(22) Filed: Oct. 4, 2021

(65) Prior Publication Data

US 2022/0024596 A1    Jan. 27, 2022

Related U.S. Application Data

(63) Continuation of application No. 16/572,801, filed on Sep. 17, 2019, now Pat. No. 11,136,132, which is a
(Continued)

(51) Int. Cl.
*B64D 15/12*    (2006.01)
*H01B 1/12*    (2006.01)
(Continued)

(52) U.S. Cl.
CPC .............. *B64D 15/12* (2013.01); *B64C 27/46* (2013.01); *H01B 1/122* (2013.01); *H05B 3/145* (2013.01);
(Continued)

(58) Field of Classification Search
CPC ........ B64D 15/12; B64C 27/46; H01B 1/122; H05B 3/145; H05B 3/146; H05B 2203/037; H05B 2214/02; H05B 2214/04
(Continued)

(56) References Cited

U.S. PATENT DOCUMENTS

| | | |
|---|---|---|
| 1,819,497 A | 8/1931 | Chisholm |
| 2,589,193 A | 3/1952 | Mayne |

(Continued)

FOREIGN PATENT DOCUMENTS

| | | |
|---|---|---|
| CN | 103044689 A | 4/2013 |
| EP | 0591951 A1 | 4/1994 |

(Continued)

OTHER PUBLICATIONS

M.R. Mahmoudian, et al., Effect of narrow diameter polyaniline nanotubes and nanofibers; in polyvinyl butyral coating on corrosion protective performance; of mild steel, Progress in Organic Coatings, vol. 75, Issue 4, Dec. 2012, pp. 301-308.
(Continued)

*Primary Examiner* — Brady W Frazier
(74) *Attorney, Agent, or Firm* — Patterson + Sheridan, LLP

(57) ABSTRACT

Composite airfoils of the present disclosure comprise a root section including a first surface. The airfoils comprise an intermediate section having a first surface and coupled with the root section at a first end. The airfoils comprise a tip section having a first surface and coupled at a first end with a second end of the intermediate section. The airfoils comprise a conductive material layer adjacent at least one of the first surface of the root section, the first surface of the intermediate section, and the first surface of the tip section. The conductive material comprises a first polymer, a second polymer, and a sulfonic acid.

20 Claims, 11 Drawing Sheets

Related U.S. Application Data continuation of application No. 15/252,056, filed on Aug. 30, 2016, now Pat. No. 10,464,680.

(51) Int. Cl.
*H05B 3/14* (2006.01)
*B64C 27/46* (2006.01)

(52) U.S. Cl.
CPC ....... *H05B 3/146* (2013.01); *H05B 2203/037* (2013.01); *H05B 2214/02* (2013.01); *H05B 2214/04* (2013.01)

(58) Field of Classification Search
USPC .................................................... 244/134 D
See application file for complete search history.

(56) References Cited

U.S. PATENT DOCUMENTS

| | | | |
|---|---|---|---|
| 2,743,890 | A | 5/1956 | La Rue |
| 2,757,273 | A | 7/1956 | Taylor |
| 3,397,302 | A | 8/1968 | Hosford |
| 3,402,772 | A | 9/1968 | Sobanik |
| 3,781,526 | A | 12/1973 | Damron |
| 3,814,540 | A | 6/1974 | Schramm et al. |
| 4,690,353 | A | 9/1987 | Haslim et al. |
| 4,990,755 | A | 2/1991 | Nishimura |
| 5,064,574 | A | 11/1991 | Oldham et al. |
| 5,129,598 | A | 7/1992 | Adams et al. |
| 5,144,113 | A | 9/1992 | Hall et al. |
| 5,657,951 | A | 8/1997 | Giamati |
| 5,716,550 | A | 2/1998 | Gardner et al. |
| 5,910,385 | A | 6/1999 | Gardner et al. |
| 6,279,856 | B1 | 8/2001 | Rutherford et al. |
| 6,310,133 | B1 | 10/2001 | Katashima et al. |
| 6,338,455 | B1 | 1/2002 | Rauch et al. |
| 6,552,107 | B1 | 4/2003 | Paul et al. |
| 6,577,358 | B1 | 6/2003 | Arakawa et al. |
| 7,763,833 | B2 | 7/2010 | Hindel et al. |
| 7,913,952 | B2 | 3/2011 | Boschet et al. |
| 8,998,144 | B2 | 4/2015 | Boone et al. |
| 10,464,680 | B2 | 11/2019 | Kinlen et al. |
| 2004/0192830 | A1 | 9/2004 | Zhang |
| 2005/0184193 | A1 | 8/2005 | Bourjac et al. |
| 2005/0242233 | A1 | 11/2005 | Battisti |
| 2007/0075188 | A1 | 4/2007 | Stoner et al. |
| 2008/0156937 | A1 | 7/2008 | Hindel et al. |
| 2008/0251642 | A1 | 10/2008 | Boschet et al. |
| 2010/0206990 | A1 | 8/2010 | Petrenko |
| 2010/0213189 | A1 | 8/2010 | Keite-Telgenbuescher et al. |
| 2010/0288882 | A1 | 11/2010 | Olson et al. |
| 2012/0125914 | A1 | 5/2012 | Yue et al. |
| 2012/0138589 | A1 | 6/2012 | Mitchell et al. |
| 2012/0256053 | A1 | 10/2012 | McCollough et al. |
| 2014/0138490 | A1 | 5/2014 | Botura et al. |
| 2014/0363291 | A1 | 12/2014 | Gaillardon et al. |
| 2015/0053668 | A1 | 2/2015 | Decker et al. |
| 2015/0096969 | A1 | 4/2015 | Uprety et al. |
| 2016/0221680 | A1 | 8/2016 | Burton et al. |
| 2018/0057176 | A1 | 3/2018 | Kinlen et al. |

FOREIGN PATENT DOCUMENTS

| | | |
|---|---|---|
| JP | 2005199999 A | 7/2005 |
| JP | 2010199071 A | 9/2010 |
| JP | 2012520206 A | 9/2012 |
| JP | 2012525476 A | 10/2012 |
| JP | 2012526724 A | 11/2012 |
| JP | 2013131319 4 | 7/2013 |
| WO | 2008085550 A2 | 7/2008 |
| WO | 20100028653 A2 | 3/2010 |
| WO | 2010132858 A2 | 11/2010 |

OTHER PUBLICATIONS

Qianqian Lin, et al., Highly sensitive and ultrafast response surface acoustic wave humidity sensor based on; electrospun polyaniline/poly(vinyl butyral) nanofibers, Analytica Chimica Acta, vol. 748, Oct. 20, 2012, pp. 73-80.

T. Pan, et al, A polyaniline based intrinsically conducting coating for; corrosion protection of structural steels, Microsc Res Tech. Nov. 2013; 76(11), pp. 1186-1195.

Jae-Woo Kim, et al., Polyaniline/Carbon Nanotube Sheet Nanocomposites: Fabrication and; Characterization, ACS Appl. Mater. Interfaces, 2013, 5 (17), pp. 8597-8606.

European Search Report for Application No. 17187914.1-1010 dated Jan. 16, 2018.

Chinese Office Action for Application No. 201710565011.8 dated Dec. 27, 2019.

Innovation, Science and Economic Development Canada Examination Report for Application No. 2968572, dated May 1, 2020.

Chinese Office Action for Application No. 20170565011.8 dated Mar. 22, 2021.

Japanese Notification of Reasons for Rejection for Application No. 2017-159057 dated Apr. 6, 2021.

Ji, S., He, W., Wang, K., Ran, Y. and Ye, C. (2014), Thermal Response of Transparent Silver Nanowire/PEDOT:PSS Film Heaters. Small, 10:4951-4960. doi:10.1002/smll.201401690 (Year: 2014).

European Patent Office, Extended European Search Report for Application 23164264.6-1004 dated Aug. 8, 2023.

ELECTRICALLY CONDUCTIVE MATERIALS FOR HEATING AND DEICING AIRFOILS

CROSS-REFERENCE TO RELATED APPLICATIONS

This application is a continuation of co-pending U.S. patent application Ser. No. 16/572,801 filed Sep. 17, 2019, which is a continuation of U.S. patent application Ser. No. 15/252,056 filed Aug. 30, 2016 and later issued on Nov. 5, 2019 as U.S. Pat. No. 10,464,680, both which are herein incorporated by reference in their entireties.

FIELD

Aspects of the present disclosure comprise airfoils comprising electrically conductive materials and methods of making and use thereof.

BACKGROUND

Cold weather conditions promote buildup of ice on vehicle surfaces. To remove the ice, large amounts of chemicals are often sprayed onto the ice to promote melting. Additionally or alternatively, electrical heating of vehicle surfaces to melt the ice involves a large energy consumption to promote sufficient deicing. The large amounts of chemicals and/or energy consumption are each a cost burden on a user of the vehicle.

Deicing is particularly challenging for airfoils, such as rotor blades, of rotorcraft vehicles, such as helicopters. State of the art deicing concepts applied to rotorcraft involve the electrothermal ice protection system. This system remains the only Federal Aviation Administration and Department of Defense approved system for rotor blade implementation.

The system comprises heaters installed in the leading edge of the blade. These de-ice heaters, around 0.0025" thick, can be integrated in the upper spar of a blade. Furthermore, conventional materials disposed on a spar are many thousandths of an inch thick, which can hinder bondability of a material to, for example, an erosion protection layer. For deicing processes, the goal of the heaters is to quickly elevate the temperature of the ice/rotor interface above 32° F. A temperature greater than 50° F. is usually sought. The heating process only melts the interface of the ice, allowing centrifugal force inherent to the rotating blades to remove the ice from the surface. Heat applied too slowly or to thin ice formations does not liberate ice because centrifugal forces are not large enough to overcome the ice/rotor bond. The ice then locally melts and the liquid water flows to the aft portions of the blade and refreezes. This process, called runback, is disadvantageous because the refreeze location is typically outside of the area affected by the heaters and the ice cannot be removed with additional heater pulses. In addition, the refreeze location, near maximum blade thickness, is usually in a region that significantly reduces airfoil performance.

The system comprises a power generator to apply electrical energy to one or more components of the rotor blade. Depending on rotor blade structure, power densities of about 25 WSI (Watts per square inch) are required to achieve the required surface temperatures with minimum power-on times. Such power densities place a large demand on the aircraft electrical system. In order to reduce the peak power demand, the heater blankets are divided into zones. These zones are fired in a specific sequence to de-ice the blade, and this sequence can be tailored to icing conditions. However, the heaters cannot have any unheated areas between zones, which adds cost to purchasing/manufacturing these rotor blades. The heaters must form as close of a butt-joint as possible to preclude areas of the blade from being unheated and therefore not permit controlled ice release from a surface of the rotor blade. The close spacing involves precision in placement of power leads. The system includes complex control system requirements, such as sensor inputs and control sequencing. Currently, rotor blade component failures typically involve installation of one or more new blades. In some cases, rotor blade component failures render the overall blade de-ice system irreparable.

Although heater designs have been continuously improved, many rotor blade materials cannot be integrated into modern, higher strain designs because they do not possess sufficient "airworthiness" properties for harsh environments, such as mechanical strength.

Another challenge for rotor blade technology is the design of an effective and reliable deicing material that is compatible with edge erosion protection layers (such as titanium, nickel, and polyurethane) disposed on (adjacent to) a surface of a rotor blade. Erosion coatings are typically thermally insulative which necessitates large energy consumption for adequate deicing of a rotor blade surface. Thus, conventional deicing material does not possess adequate electrical properties in addition to durable erosion impact protection for longevity from harsh environments. Conventional surface coating(s) of vehicle components of an aircraft, and rotor blades in particular, are typically not highly conductive, having resistivity of hundreds of kOhms to tens of MegaOhms. Accordingly, conventional surface coatings of an aircraft can allow charge buildup on surfaces (and other components) of the aircraft. In addition to an inability to dissipate charge buildup, conventional coatings might not possess other ideal "airworthiness" properties. For example, performance as to durability parameters such as rain erosion, resistance to UV light, resistance to high temperature, resistance to low temperature, inadequate flexibility, and resistance to sand and hail damage might not be ideal for conventional surface coatings on a surface of a vehicle, such as an aircraft, exposed to harsh conditions.

What is needed in the art are materials that are both conductive and otherwise airworthy and methods of making and using the materials.

SUMMARY

In at least one aspect, a composite airfoil comprises a root section comprising a first surface, and an intermediate section comprising a first surface and coupled with the root section at a first end. The airfoil comprises a tip section comprising a first surface and coupled at a first end with a second end of the intermediate section. The airfoil comprises a conductive material layer coupled to at least one of the first surface of the root section, the first surface of the intermediate section, or the first surface of the tip section. The conductive material comprises a first polymer, a second polymer, and a sulfonic acid.

In at least one aspect, a composite airfoil comprises a root section comprising a first surface, and an intermediate section comprising a first surface and coupled with the root section at a first end. The airfoil comprises a tip section comprising a first surface and coupled at a first end with a second end of the intermediate section. The airfoil comprises a conductive material layer adjacent at least one of the first surface of the root section, the first surface of the intermediate section, and the first surface of the tip section. The conductive material comprises a carbon allotrope material, an electrically conductive polymer, and a sulfonic acid.

In at least one aspect, a method of forming a conductive material disposed on a composite airfoil comprises mixing a first polymer and a second polymer to form a first material. The method comprises depositing the first material onto an airfoil and curing the first material.

In at least one aspect, a method of forming a conductive material disposed on a composite airfoil comprises depositing a first material comprising a polymer and a sulfonic acid onto a carbon allotrope material disposed on an airfoil to form a second material disposed on the airfoil, and curing the second material.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

The present disclosure relates to airfoils comprising materials useful for components subjected to static buildup in use and deicing. The materials generally include high conductivity in addition to other ideal airworthiness properties. As used herein, "airfoil" comprises a substrate in the shape of a wing or a blade (of a propeller, rotor, or turbine). Airfoils comprise rotor blades, static wing surfaces of rotorcraft or fixed wing aircraft. Airfoils, such as rotor blades, comprise one or more surfaces, such as an outer surface, and one or more components as described in more detail below. As described herein, "airfoil component" comprises any suitable structure adapted, in combination with one or more other airfoil components, to form an airfoil.

Figure 1A:
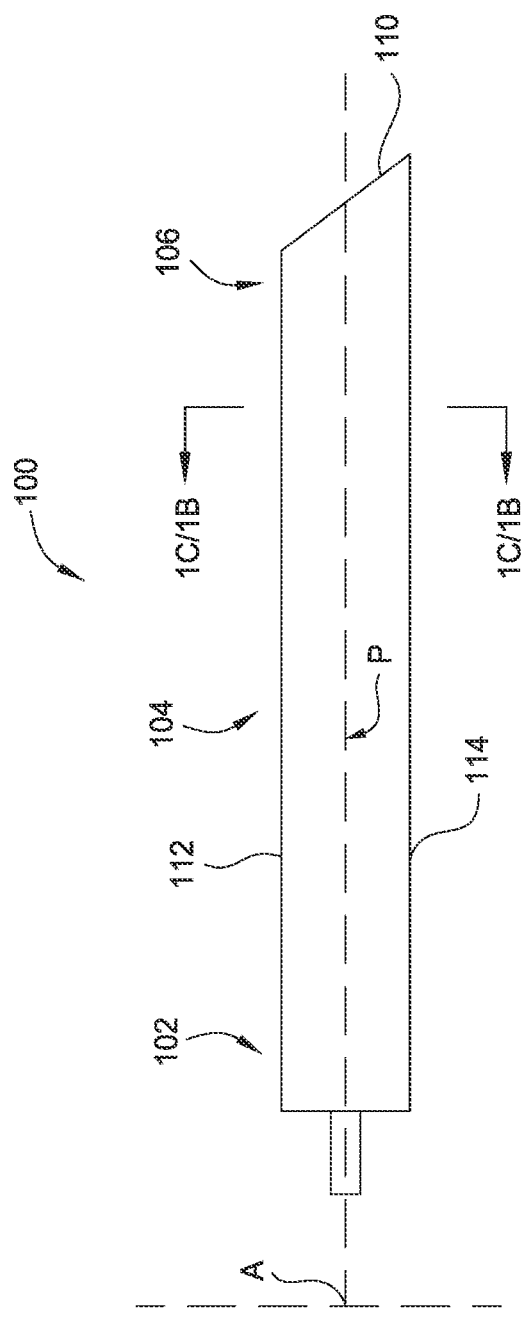
FIG. 1A is a perspective view of a rotor blade, according to some aspects of the present disclosure.

Rotor blades of the present disclosure comprise one or more rotor blade components. As described herein, "rotor blade component" comprises any suitable structure adapted, in combination with one or more other rotor blade components, to form a rotor blade. FIG. 1A is a perspective view of a rotor blade, according to some aspects of the present disclosure. As shown in FIG. 1A, rotor blade 100 of a main rotor assembly (not shown) is made of a root section 102, an intermediate section 104, and a tip section 106. Each of sections 102, 104, 106 is any suitable geometry to tailor rotor blade aerodynamics to the velocity increase along the rotor blade span. Rotor blade tip section 106 comprises an angled geometry such as anhedral, cathedral, gull, and bent, among others. Rotor blade sections 102, 104, 106 define a span of rotor blade 100 between the axis of rotation A and a distal end 110 of tip section 106 along a longitudinal axis P between a first edge 112 and a second edge 114.

Figure 1B:
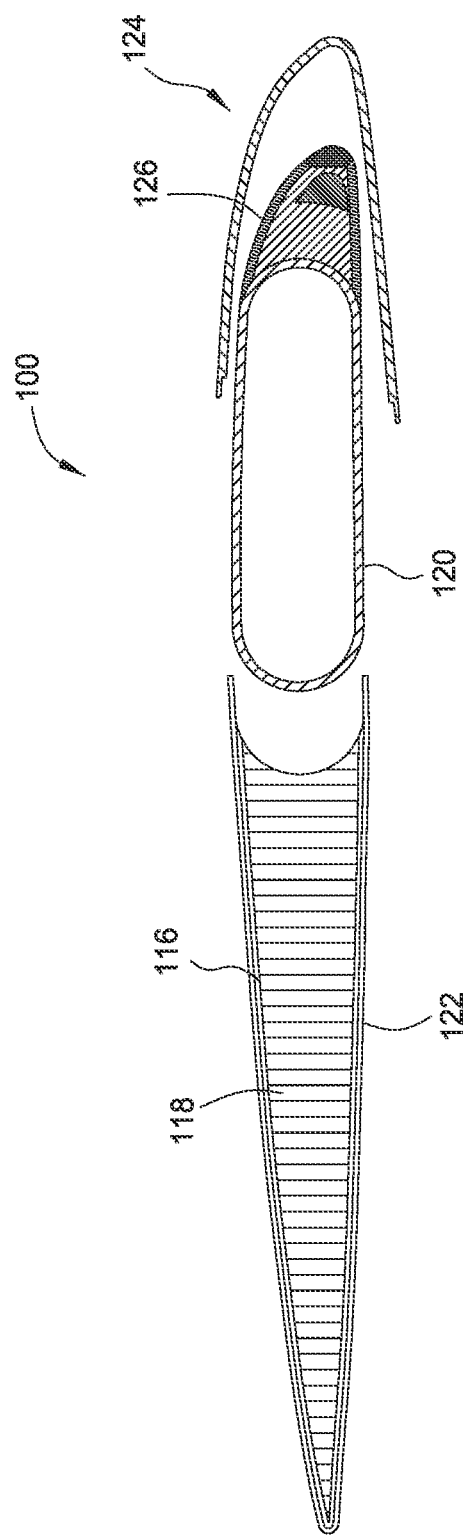
FIG. 1B is an exploded view of the rotor blade of FIG. 1A, according to some aspects of the present disclosure.

FIG. 1B is an exploded view of the rotor blade of FIG. 1A. As shown in FIG. 1B, rotor blade 100 is made of an upper skin 116, a core 118, a main spar 120, a lower skin 122, and a leading edge assembly 124. Core 118 comprises a lightweight foam material, honeycomb material or combinations thereof. Skins 116 and 122 comprise one or more plies of prepreg composite material such as woven fiberglass material embedded in any suitable resin matrix material. Resin matrix material comprises an epoxy resin, a polyimide high-temperature polymer-matrix composite, a bismaleimide high-temperature polymer-matrix composite, an inorganic polymer, a polybenzoxazole, a polybenzoxazine, a polyetheretherketone, or combinations thereof. Alternatively or additionally, one or more electrostatically dissipative material layers 150 of the present disclosure may be disposed on (e.g., adjacent) a surface of one or more components of a rotor blade, such as sections 102, 104, and/or 106, skins 116, core 118 and 122, edge assembly 124, counterweight assembly 126 and/or spar 120, as described in more detail below. Spar 120, core 118 and skins 116 and 122 are generally referred to as a pocket assembly, the forward portion of which is capped by leading edge assembly 124. Spar 120 comprises titanium, other metals, composite materials, or combinations thereof. In at least one aspect, spar 120, core 118, skins 116 and 122, and leading edge assembly 124 are separated into a multiple of segments which may include various combinations of spanwise lengths (as opposed to chordwise lengths).

Figure 1C:
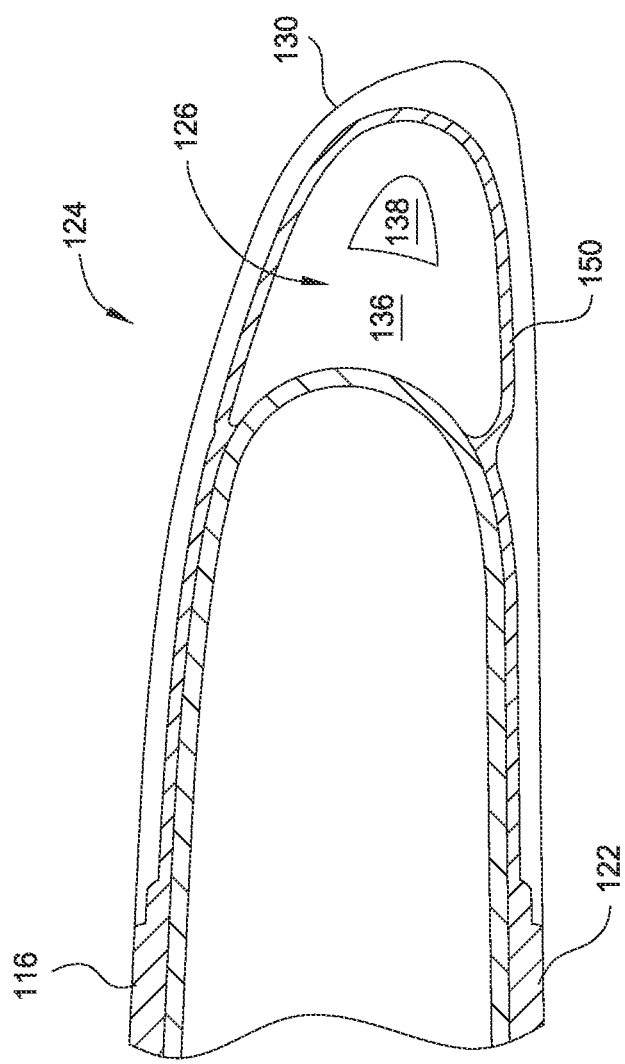
FIG. 1C is an expanded sectional view of the rotor blade of FIG. 1A, according to some aspects of the present disclosure.

FIG. 1C is an expanded sectional view of the rotor blade of FIG. 1A. As shown in FIG. 1C, edge assembly 124 is made of a wear-resistant material layer 130 such as a titanium erosion layer or a nickel erosion layer to provide abrasion protection. Wear-resistant material layer 130 is disposed on (e.g., adhesively bonded to) a conductive material layer 150. Conductive material layer 150 is disposed on (e.g., adhesively bonded to) spar 120 and/or counterweight assembly 126. Edge assembly 124 may comprise any additional suitable wear-resistant material and electrostatically dissipative materials. Adhesive bonding comprises polyester adhesives and/or epoxy adhesives.

A counterweight assembly 126 is made of a filler 136 with a weight 138 located therein. Filler 136 comprises one or more plies of prepreg composite material such as woven fiberglass material embedded in a suitable resin matrix material with weight 138 contained therein. Resin matrix material comprises an epoxy resin, a polyimide high-temperature polymer-matrix composite, a bismaleimide high-temperature polymer-matrix composite, an inorganic polymer, a polybenzoxazole, a polybenzoxazine, polyetheretherketones, and combinations thereof. Counterweight assembly 126 is adhesively bonded to an edge of spar 120 such that counterweight assembly 126 is disposed between conductive material layer 150 and edge of spar 120. Counterweight assembly 126 provides weight balance of rotor blade 100. In at least one aspect, counterweight assembly 126 is made of counterweights 138 that are foam, tungsten, lead, or mixtures thereof, in the spanwise direction from root section 102 to tip section 106 so as to provide a weight distribution that weight balances rotor blade 100.

One or more materials of the present disclosure are disposed on one or more components of a rotor blade (e.g., components of blade assembly 100). In at least one aspect, the one or more materials are disposed at one or more locations of a rotor blade surface and/or rotor blade component to form a zone of material disposed on the rotor blade and/or rotor blade component, for example conductive material layer 150 of FIGS. 1B and 1C is a zone of material. Because of the electrical properties of the material of the present disclosure, the zones of material disposed on the rotor blade surface and/or rotor blade component can have smaller dimensions than zones of conventional heating materials. In at least one aspect, a zone of material is a spanwise zone with a width of between about 0.5 inch and about 10 inches, such as between about 1 inch and about 3 inches, for example about 1 inch, about 2 inches, about 3 inches. In some aspects, a zone of material is a chordwise zone with a width of between about 0.5 inches and about 100 inches, such as between about 10 inches and about 40 inches, such as between about 18 inches and about 36 inches, for example about 18 inches, about 24 inches, about 30 inches, about 36 inches. In some aspects, a rotor blade comprises between about 1 and about 500 material zones, such as between about 2 zones and about 100 zones, such as between about 3 zones and about 10 zones, for example 3 zones, 4 zones, 5 zones. Material zones may be disposed chordwise, spanwise, or a combination of both on a rotor blade.

Materials of the present disclosure provide rapid surface heating (e.g., to about 150° C.) of a rotor blade surface and/or rotor blade component which provides reduced energy consumption for adequate deicing of one or more components of a rotor blade surface and/or rotor blade component. Rapid surface heating is advantageous because it reduces overall energy demand of heaters of a rotor blade as compared to typical rotor blades. In at least one aspect, heaters are not present at all within a rotor blade of the present disclosure. Furthermore, material of the present disclosure may be disposed on a surface on or above the spar of the rotor blade, unlike the heaters of typical rotor blades. This aspect provides facile repair of components of a rotor blade without involving substantial deconstruction of the rotor blade to repair, for example, a heater.

In at least one aspect, a material comprises a carbon allotrope material, a first polymer, and a sulfonic acid (e.g., DNNSA). First polymer and/or sulfonic acid may be disposed on carbon allotrope material (e.g., as a layer) and/or may be disposed in the carbon allotrope material (e.g., present in a cavity of the carbon allotrope material). Carbon allotrope material comprises multi-walled carbon-nanotubes such as single-walled carbon nanotubes (SWNTs) and/or double-walled carbon nanotubes (DWNTs), graphenes, polycarbonates, fullerenes, and/or mixtures thereof. Carbon allotrope material of the present disclosure provides additional electrical, mechanical, and/or thermal control of a material. In at least one aspect, a carbon allotrope material is conductive, porous, and/or woven (ordered) or non-woven (disordered) sheets of organic and/or inorganic material. In at least one aspect, a carbon allotrope material is a metal-coated carbon allotrope material, for example, metal-coated carbon nanotubes. Metals comprise nickel and/or copper.

In at least one aspect, the carbon allotrope material is a sheet of carbon allotrope material. The sheet material provides a material with improved flexibility and tensile strength. Sheet material can be multilayered comprising a plurality of sheet materials. For example, one or more graphene layers are deposited followed by deposition of one or more conductive polymers and a sulfonic acid onto the graphene layers and/or impregnated between the graphene layers.

In at least one aspect, materials of the present disclosure further comprise a fiber material. Fiber material comprises graphite, carbon-fiber, fiberglass, nylon, aramid polymers, polyethylenes, or mixtures thereof. For example, a fiberglass veil comprises a carbon nanotube coating, each of which comprises one or more conductive polymers and one or more sulfonic acids. The fiber material is woven or non-woven. Non-woven fibers comprise, for example, fiberglass, fiberglass cloth, carbon-fiber, and/or mixtures thereof. Woven material and/or non-woven material provide further tuning of electrical and mechanical properties of materials of the present disclosure.

In at least one aspect, a material including a carbon allotrope material has an electrical conductivity value (e.g., Ohms/square) between about 1.2 times (×) and about 20× higher than an Ohms/square value of the carbon allotrope material alone and/or the material without the carbon allotrope material, such as between about 1.5× and about 10×, such as between about 2× and about 5×, for example about 2×, about 3×, about 4×, about 5×. In at least one aspect, a material comprising a carbon allotrope material has a mechanical strength value (e.g., tensile strength: MPa)

between about 1.2× and about 20× higher than a mechanical strength value of the carbon allotrope material alone and/or the material without the carbon allotrope material, such as between about 1.5× and about 10×, such as between about 2× and about 5×, for example about 2×, about 3×, about 4×, about 5×. In at least one aspect, a material comprising a carbon allotrope material has a thermal conductivity value between about 1.2× and about 20× higher than a thermal conductivity value of the carbon allotrope material alone and/or the material without the carbon allotrope material, such as between about 1.5× and about 10×, such as between about 2× and about 5×, for example about 2×, about 3×, about 4×, about 5×. In at least one aspect, a material comprises between about 20 wt % and about 80 wt % of a carbon allotrope material, such as between about 40 wt % and about 60 wt %, for example about 40 wt %, about 45 wt %, about 50 wt %, about 55 wt %, about 60 wt %. In at least one aspect, a material comprises between about 10 wt % and about 25 wt % of a carbon allotrope material, for example 10 wt %, 15 wt %, 20 wt %, 25 wt %.

In at least one aspect, the first polymer is a polyaniline (PANI), a poly(ethylenedioxythiophene) (PEDOT), a poly(styrenesulfonate) (PSS), a polyurethane, a polyvinyl butyral, a polyacrylate, an epoxy, a glycidyl-Si—Zr-containing solgel, a polyester, a phenoxy resin, a polysulfide, mixtures thereof, or salts thereof. The polyaniline may comprise between about 0.1 weight percent (wt %) and about 25 wt % of the material. In at least one aspect, a material may comprise between about 20 wt % and about 80 wt % of a first polymer, such as between about 40 wt % and about 60 wt %, for example about 40 wt %, about 45 wt %, about 50 wt %, about 55 wt %, about 60 wt %. The first polymer may be a mixture of a poly(ethylenedioxythiophene) and a poly(styrenesulfonate), and the mixture may be between about 1 wt % and about 50 wt % of the material, such as between about 10 wt % and about 25 wt %, for example 10 wt %, 15 wt %, 20 wt %, 25 wt %.

The sulfonic acid decreases resistivity of an electrically conductive material of the present disclosure.

In at least one aspect, the sulfonic acid is a naphthyl sulfonic acid of Formula (I):

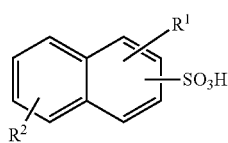

Each benzene ring of Formula (I) is unsubstituted, monosubstituted, disubstituted, trisubstituted, or tetrasubstituted with $R^1$ or $R^2$, as appropriate. Each instance of $R^1$ is independently selected from alkyl (e.g., C1-C20 alkyl), aryl, amino, nitro, and halo (—F, —Cl, —Br, —I), and each instance of $R^2$ is independently selected from alkyl (e.g., C1-C20 alkyl), aryl, amino, nitro, and halo (—F, —Cl, —Br, —I). C1-C20 alkyl substituted naphthylsulfonic acid comprises dinonylnaphthylsulfonic acid, methylnaphthylsulfonic acid, ethylnaphthylsulfonic acid, propylnaphthylsulfonic acid, butylnaphthylsulfonic acid, pentylnaphthylsulfonic acid, hexylnaphthylsulfonic acid, heptylnaphthylsulfonic acid, octylnaphthylsulfonic acid, nonylnaphthylsulfonic acid, decylnaphthylsulfonic acid, dimethylnaphthylsulfonic acid, diethylnaphthylsulfonic acid, dipropylnaphthylsulfonic acid, dibutylnaphthylsulfonic acid, dipentylnaphthylsulfonic acid, dihexylnaphthylsulfonic acid, diheptylnaphthylsulfonic acid, dioctylnaphthylsulfonic acid, didecylnaphthylsulfonic acid.

| Chemical Name | Non-limiting Example Chemical Structures |
|---|---|
| dinonylnaphthylsulfonic acid | |
| methylnaphthylsulfonic acid | |
| ethylnaphthylsulfonic acid | |

-continued
| Chemical Name | Non-limiting Example Chemical Structures |
|---|---|
| propylnaphthylsulfonic acid | 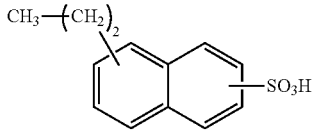 |
| | 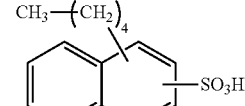 |
| | 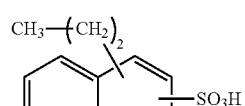 |
| | 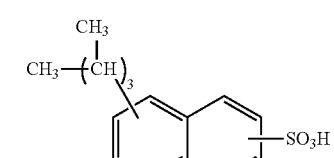 |
| butylnaphthylsulfonic acid | 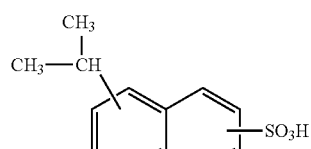 |
| | 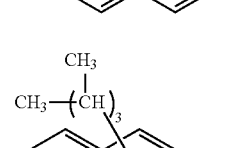 |
| | 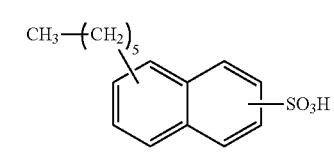 |
| | 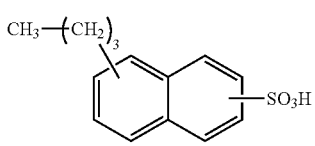 |
| pentylnaphthylsulfonic acid | 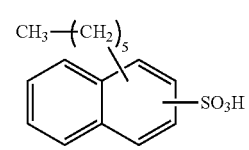 |
-continued
| Chemical Name | Non-limiting Example Chemical Structures |
|---|---|
| | 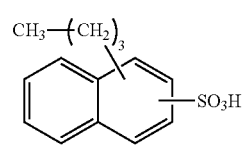 |
| | 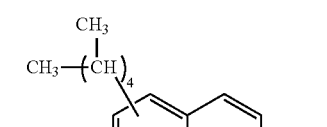 |
| | 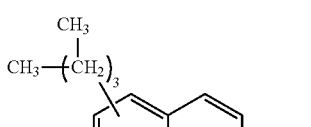 |
| hexylnaphthylsulfonic acid | 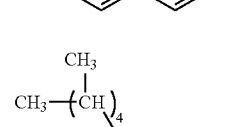 |
| | 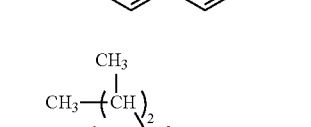 |
| | 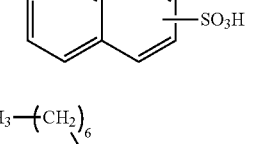 |
| | 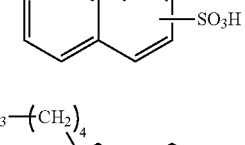 |
| heptylnaphthylsulfonic acid | CH$_3$—(CH$_2$)$_6$—naphthyl—SO$_3$H |
| | CH$_3$—(CH$_2$)$_6$—naphthyl—SO$_3$H |

-continued
| Chemical Name | Non-limiting Example Chemical Structures |
|---|---|
|  | 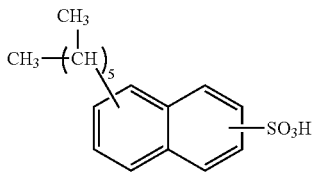 |
| octylnaphthylsulfonic acid | 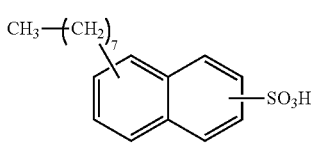 |
|  | 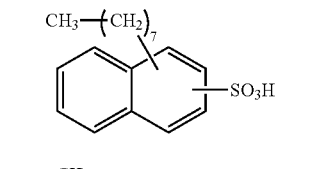 |
|  | 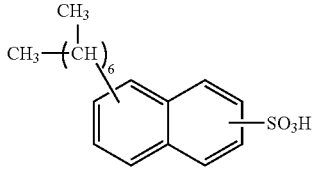 |
|  | 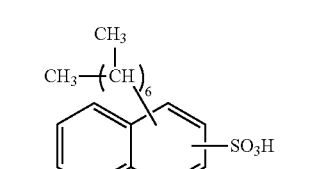 |
| nonylnaphthylsulfonic acid | 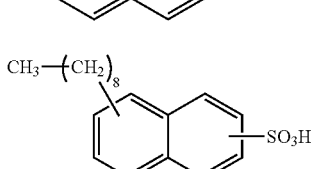 |
|  | 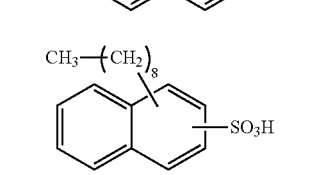 |
|  | 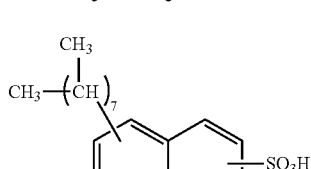 |
|  | 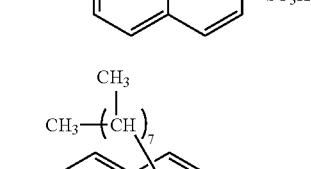 |
-continued
| Chemical Name | Non-limiting Example Chemical Structures |
|---|---|
| decylnaphthylsulfonic acid | 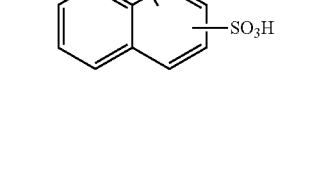 |
|  |  |
|  | 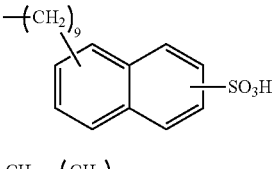 |
|  | 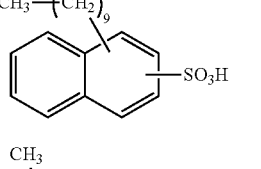 |
| dimethylnaphthylsulfonic acid | 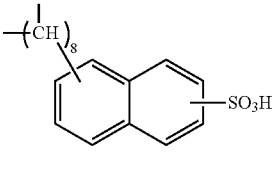 |
|  | 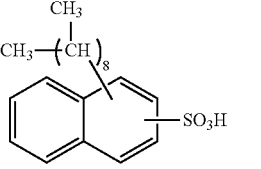 |
| diethylnaphthylsulfonic acid | 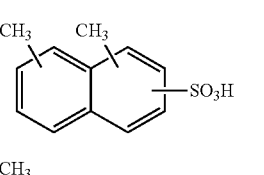 |
|  | 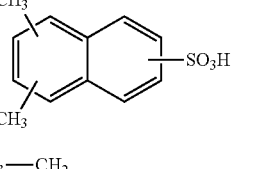 |
| dipropylnaphthylsulfonic acid | 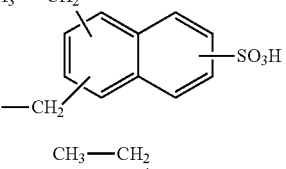 |
|  | 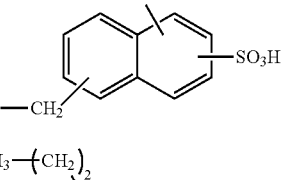 |

| Chemical Name | Non-limiting Example Chemical Structures |
|---|---|
| dibutylnaphthylsulfonic acid | (structures of diisopropyl- and dibutyl-naphthylsulfonic acid isomers) |

| Chemical Name | Non-limiting Example Chemical Structures |
|---|---|
| dipentylnaphthylsulfonic acid | (structures of dipentylnaphthylsulfonic acid isomers) |
| dihexylnaphthylsulfonic acid | (structures of dihexylnaphthylsulfonic acid isomers) |

| Chemical Name | Non-limiting Example Chemical Structures |
|---|---|
| | 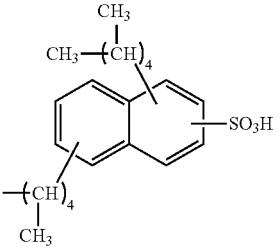 |
| diheptylnaphthylsulfonic acid | 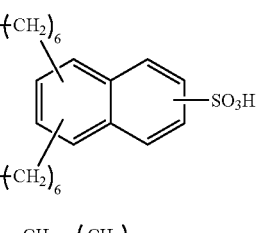 |
| | 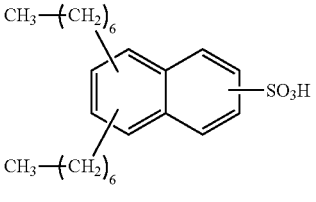 |
| | 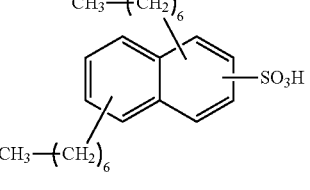 |
| | 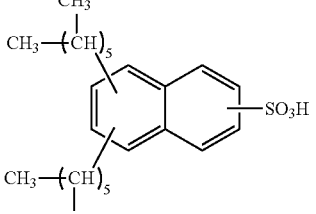 |
| dioctylnaphthylsulfonic acid | 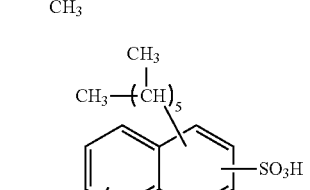 |
| | 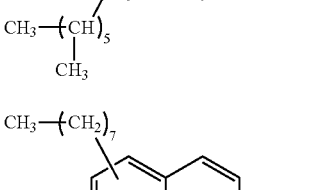 |

| Chemical Name | Non-limiting Example Chemical Structures |
|---|---|
| | 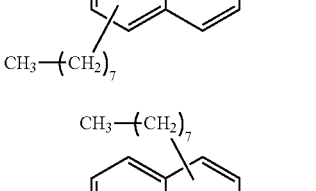 |
| | 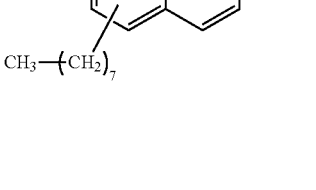 |
| didecylnaphthylsulfonic acid | 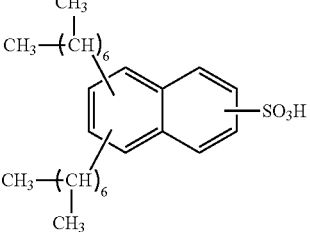 |
| | 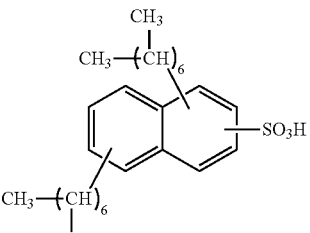 |
| | 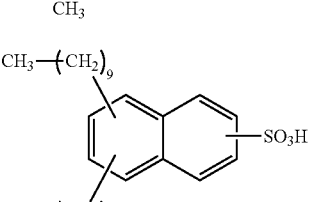 |
| | 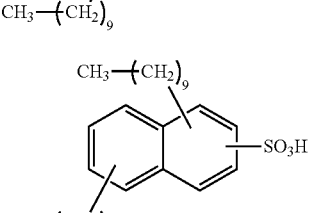 |

An electrically conductive material may comprise a naphthylsulfonic acid between about 1 wt % and about 50 wt %, such as between about 3 wt % and about 25 wt %, such as between about 10 wt % and about 15 wt %, for example 5 wt %, 10 wt %, 15 wt %. Other sulfonic acids comprise phenyl sulfonic acids, anthracenyl sulfonic acids, pyrenyl sulfonic acids, each of which is unsubstituted, monosubtituted or multiplysubstituted, where each instance of substitution is independently alkyl (e.g., C1-C20 alkyl), aryl, amino, nitro, or halo (—F, —Cl, —Br, —I).

In at least one aspect, an electrically conductive material is made of a carbon allotrope material, a first polymer, a second polymer, and a sulfonic acid. The carbon allotrope material, first polymer, and sulfonic acid are as described above. The second polymer is a polyurethane, a polyvinyl butyral, a polyacrylate, an epoxy, a glycidyl-Si—Zr-containing solgel, a polyester, a phenoxy resin, a polysulfide, mixtures thereof, or salts thereof.

In at least one aspect, an electrically conductive material is made of a first polymer, a second polymer, and a sulfonic acid. The first polymer, the second polymer, and the sulfonic acid are as described above.

A carbon allotrope material, a first polymer, and/or a second polymer of materials of the present disclosure is unsubstituted, monosubstituted, or multiplysubstituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I). In at least one aspect, a material is made of between about 20 wt % and about 80 wt % of a second polymer, such as between about 40 wt % and about 60 wt %, for example about 40 wt %, about 45 wt %, about 50 wt %, about 55 wt %, about 60 wt %. The second polymer may be a polyurethane or a polyvinyl butyral. The polyvinyl butyral may comprise between about 10 wt % and about 40 wt % of the material, such as between about 10 wt % and about 25 wt %, for example 10 wt %, 15 wt %, 20 wt %, 25 wt %.

In at least one aspect, carbon allotrope material of materials of the present disclosure are sheet material comprising multi-walled carbon-nanotubes such as single-walled carbon nanotubes (SWNTs) and/or double-walled carbon nanotubes (DWNTs), graphenes, polycarbonates, and fullerenes.

First polymers of materials of the present disclosure comprise polyanilines (PANIs), poly(ethylenedioxythiophene)s (PEDOTs), poly(styrenesulfonate)s (PSSs), polyurethanes, polyvinyl butyrals, acrylates, epoxies, glycidyl-Si—Zr-containing solgels, thermoplastics such as polyesters, resins such as phenoxy resins, sealants such as polysulfides, and mixtures thereof.

Second polymers of materials of the present disclosure comprise PANIs, PEDOTs, PSSs, polyurethanes, polyvinyl butyrals, acrylates, epoxies, glycidyl-Si—Zr-containing solgels, thermoplastics such as polyesters, resins such as phenoxy resins, sealants such as polysulfides, and mixtures thereof.

Epoxies comprise partially cured epoxies, a particular addition of epoxies, two-component epoxy resin that includes a catalyst (such as HYSOL® EA 956 epoxy resin available from Henkel Corporation of Bay Point, Calif.), a two liquid system that includes both a resin and a hardener (such as EPOFIX resin available from Struers A/S of Ballerup, Denmark), triglycidyl ethers of aminophenol (such as Araldite MY 0500 or MY 0510 from Huntsman Advanced Materials (Monthey, Switzerland)), tetrafunctional epoxies such as N,N,N',N'-tetraglycidyl-m-xylenediamines (such as Araldite MY0720 or MY0721 from Huntsman Advanced Materials (Monthey, Switzerland)), and mixtures thereof. Epoxies also comprise a difunctional epoxy, such a Bisphenol-A (Bis-A) or Bisphenol-F (Bis-F)-based epoxies. Bis-A epoxy resin is available commercially as Araldite GY6010 (Huntsman Advanced Materials) or DER 331, which is available from Dow Chemical Company (Midland, Mich.). A Bis-F epoxy resin is available commercially as Araldite GY281 and GY285 (Huntsman Advanced Materials). Epoxies, for example, are suitable for thermosets on the outside of aircraft because they are durable, e.g. aft of a leading edge surface or beneath a surface of erosion protective materials of a rotor blade.

Polyanilines comprise, for example, a polyaniline of Formula (II):

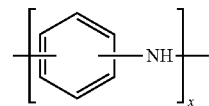

(where x is a positive integer, such as between about 10 and about 10,000), leucoemeraldine, emeraldine, and (per)nigraniline, mixtures thereof, salts thereof, and bases thereof. Polyanilines are unsubstituted, monosubstituted, or multiplysubstituted (e.g., disubstituted, trisubstituted, or tetrasubstituted) where each instance of substitution is independently alkyl (e.g., C1-C20 alkyl), aryl, amino, nitro, or halo (—F, —Cl, —Br, —I).

Poly(ethylenedioxythiophene)s comprise, for example, a poly(ethylenedioxythiophene) of the Formula (III):

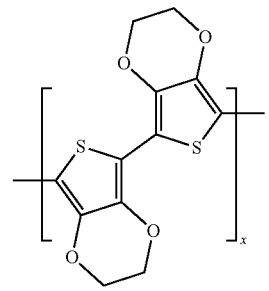

(where x is a positive integer, such as between about 10 and about 10,000) and/or salts thereof. Poly(ethylenedioxythiophene)s are unsubstituted, monosubstituted, or multiplysubstituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I).

Poly(styrenesulfonate)s comprise, for example, a poly(styrenesulfonate) of the Formula (IV):

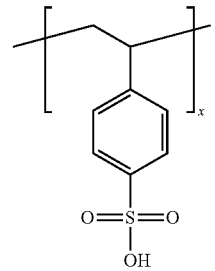

(where x is a positive integer, such as between about 10 and about 10,000) and/or salts thereof. Poly(styrenesulfonate)s are unsubstituted, monosubstituted, or multiplysubstituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I).

Acrylates comprise, for example, a polyacrylate of Formula (V):

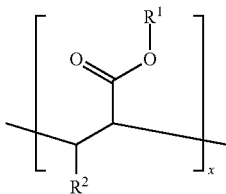

(where x is a positive integer, such as between about 10 and about 10,000) and/or salts thereof. $R^1$ and $R^2$ is independently C1-C20 alkyl or C1-C20 hydroxyalkyl. In at least one aspect, $R^2$ is methyl. Acrylates comprise hydroxyalkyl polyacrylates, hydroxyalkyl polymethacrylates, alkyl polyacrylates, and alkyl polymethacrylates. Examples of suitable hydroxyalkyl polyacrylates, or hydroxyalkyl polymethacrylates comprise poly(2-hydroxyethyl acrylate), poly(2-hydroxy-1-methylethyl acrylate), poly(2-hydroxypropyl acrylate), poly(3-hydroxypropyl acrylate), poly(2-hydroxybutyl acrylate), poly(4-hydroxybutyl acrylate), poly(2-hydroxyethyl methacrylate), poly(2-hydroxy-1-methylethyl methacrylate), poly(2-hydroxypropyl methacrylate), poly(3-hydroxypropyl acrylate), poly(2-hydroxybutyl methacrylate), poly(4-hydroxybutyl methacrylate) and the like, and acrylic acid or methacrylic acid esters of ethylene glycol and propylene glycol such as poly(diethylene glycol acrylate), and the like. Also useful are hydroxy-containing esters and/or amides of unsaturated acids such as maleic acid, fumaric acid, itaconic acid, and the like. In at least one aspect, a hydroxy-acrylic polymer is made of from 5 percent to 35 percent by weight of monoethylenically unsaturated hydroxy-containing monomers based on total acrylate weight, and in certain embodiments from 10 percent to 25 percent by weight. Suitable alkyl polyacrylates and polymethacrylates comprise poly(methyl acrylate), poly (ethyl acrylate), poly(propyl acrylate), poly(isopropyl acrylate), poly(butyl acrylate), poly(isobutyl acrylate), poly (hexyl acrylate), poly(2-ethylhexyl acrylate), poly(nonyl acrylate), poly(lauryl acrylate), poly(stearyl acrylate), poly (cyclohexyl acrylate), poly(isodecyl acrylate), poly(phenyl acrylate), poly(isobornyl acrylate), poly(methyl methacrylate), poly(ethyl methacrylate), poly(propyl methacrylate), poly(isopropyl methacrylate), poly(butyl methacrylate), poly(isobutyl methacrylate), poly(hexyl methacrylate), poly (2-ethylhexyl methacrylate), poly(nonyl methacrylate), poly (lauryl methacrylate), poly(stearyl methacrylate), poly(cyclohexyl methacrylate), poly(isodecyl methacrylate), poly (phenyl methacrylate), poly(isobornyl methacrylate), and the like.

Polyurethanes comprise, for example, a polyurethane of Formula (VI):

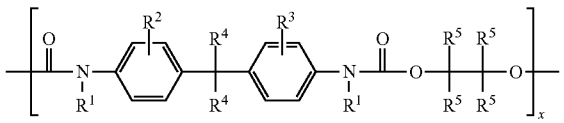

(where x is an integer between about 10 and about 10,000). Each instance of $R^1$, $R^2$, $R^3$, $R^4$, and $R^5$ is independently hydrogen or C1-C20 alkyl. Polyurethanes comprise Aptek 2100 A/B and Aerodur 3002 (available from Argosy International, Inc.). Polyurethanes are unsubstituted, monosubstituted, or multiplysubstituted (e.g., disubstituted, trisubstituted, or tetrasubstituted) where each instance of substitution is independently alkyl (e.g., C1-C20 alkyl), aryl, amino, nitro, or halo (—F, —Cl, —Br, —I).

Materials of the present disclosure may be disposed (e.g., as a layer) on a component of an airfoil, such as a rotor blade surface and/or rotor blade component. A material (e.g., as a layer) may be between about 0.1 μm and about 100 μm in thickness, such as between about 1 μm and about 8 μm, such as between about 2 μm and about 6 μm, for example about 0.1 μm, about 1 μm, about 2 μm, about 3 μm, about 4 μm, about 5 μm, about 6 μm, about 7 μm, about 8 μm, about 9 μm, about 10 μm. Electrical properties of materials of the present disclosure provide thin layers for deicing an airfoil, such as a rotor blade surface and/or rotor blade component. Thin material layers are advantageous for application of an electrically conductive surface in a confined structure such as a blade spar of a rotor blade. Conventional materials disposed on a spar, for example, are many thousandths of an inch thick, which can hinder bondability of a material to an erosion protection layer. In at least one aspect, materials have a resistance of between about 1e+4Ω/□ and about 1e+8Ω/□, for example about 1e+4Ω/□, about 1e+5Ω/□, about 1e+6Ω/□, about 1e+7Ω/□, about 1e+8Ω/□. Conductivity, which is the inverse of resistivity, provides electrostatic dissipation and deicing.

An electrically conductive material may be one or more reaction products of a first polymer in a solvent at a percent solids of between about 0.1 wt % and about 30 wt %, a polyol, an isocyanate, a carbon allotrope material, and a sulfonic acid. In at least one aspect, an electrically conductive material is made of one or more reaction products of a first polymer in a solvent at a percent solids of between about 0.1 wt % and about 30 wt %, a polyol, an isocyanate, and a sulfonic acid. A polymer may be present in a solvent to a % solids of between about 0.1 wt % and about 30 wt %, such as between about 1 wt % and about 15 wt %, for example about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %. The first polymer comprises a polyaniline, a poly(ethylenedioxythiophene), a poly(styrenesulfonate), or mixtures thereof. The solvent comprises a xylene, a benzene, a toluene, dimethyl sulfoxide, water, or mixtures thereof. The sulfonic acid comprises a napthyl sulfonic acid.

In the methods that follow, the first polymer, the second polymer, the carbon allotrope material, and the sulfonic acid are as described above.

In at least one aspect, a method for forming an electrically conductive material comprises depositing a carbon allotrope material such as carbon nanotubes, graphenes, polycarbonates, and/or fullerenes onto a substrate, followed by curing to form a sheet material. The method further comprises depositing a first polymer and/or second polymer onto the sheet material to form a first material disposed on the substrate. The method comprises curing the first material. The substrate may be a component of a rotor blade, and the first material may be a layer having a thickness of between about 0.1 μm and about 10 μm after deposition and/or curing, such as between about 1 μm and about 8 μm, such as between about 2 μm and about 6 μm, for example about 0.1 μm, about 1 μm, about 2 μm, about 3 μm, about 4 μm, about 5 μm, about 6 μm, about 7 μm, about 8 μm, about 9 μm, about 10 μm. The method may comprise dissolving the first polymer and/or second polymer in a solvent before depositing the first polymer and/or second polymer onto the carbon allotrope material. The solvent comprises a xylene, a benzene, a toluene, dimethyl sulfoxide, water, or mixtures thereof. Depositing comprises flow-coating, drop-casting, dip-coating, spray-coating, screen printing, slot-die coating, flow coating and/or ink-jet printing. Flow-coating comprises depositing material on a first end of a substrate and angling the substrate to flow the material toward a second end of the substrate, which provides a gradient of material from the first end to the second end. Deposition conditions may be adjusted, which does not affect length of carbon allotrope material (which correlates to conductivity), aerial density of carbon allotrope material and weight density of carbon allotrope material (e.g., thinner veil in thickness and/or dispersion).

In at least one aspect, a method for forming an electrically conductive material comprises depositing a first polymer onto a carbon allotrope material to form a first material disposed on a substrate. In at least one aspect, the carbon allotrope material is a sheet material. The method comprises curing the first material. The substrate may be a component of an airfoil, such as a rotor blade surface and/or rotor blade component, and the first material comprises a layer having a thickness of between about 0.1 µm and about 10 µm after deposition, such as between about 1 µm and about 8 µm, such as between about 2 µm and about 6 µm, for example about 0.1 µm, about 1 µm, about 2 µm, about 3 µm, about 4 µm, about 5 µm, about 6 µm, about 7 µm, about 8 µm, about 9 µm, about 10 µm. The method may comprise dissolving the first polymer in a solvent before depositing the first polymer onto the carbon allotrope material. The solvent comprises a xylene, a benzene, a toluene, dimethyl sulfoxide, water, or mixtures thereof. Depositing comprises flow-coating, drop-casting, dip-coating, spray-coating, screen printing, slot-die coating, flow coating and/or ink-jet printing.

In at least one aspect, a method for forming an electrically conductive material comprises depositing a first polymer and/or second polymer onto a substrate to form a first material disposed on the substrate. The method may comprise curing the first material. The substrate may be a component of an airfoil, such as a rotor blade surface and/or rotor blade component, and the first material may be a layer having a thickness of between about 0.1 µm and about 10 µm after deposition and/or curing, such as between about 1 µm and about 8 µm, such as between about 2 µm and about 6 µm, for example about 0.1 µm, about 1 µm, about 2 µm, about 3 µm, about 4 µm, about 5 µm, about 6 µm, about 7 µm, about 8 µm, about 9 µm, about 10 µm. The method may comprise dissolving the first polymer and/or second polymer in a solvent before depositing the first polymer and/or second polymer onto the substrate. The solvent comprises a xylene, a benzene, a toluene, dimethyl sulfoxide, water, or mixtures thereof. Depositing comprises flow-coating, drop-casting, dip-coating, spray-coating, screen printing, slot-die coating, flow coating and/or ink-jet printing. The method may further comprise depositing a carbon allotrope material such as carbon nanotubes, graphenes, polycarbonates, and/or fullerenes onto the first material, followed by curing, to form a second material having a carbon allotrope material. Deposition conditions may be adjusted, which does not affect length of carbon allotrope material (which correlates to conductivity), aerial density of carbon allotrope material and weight density of carbon allotrope material (e.g., thinner veil in thickness and/or dispersion). Thus, electrical properties of a material can be controlled by the content of the material, such as amount and type of polymer, sulfonic acid, solvent, etc.

In at least one aspect, a method for forming an electrically conductive material comprises mixing a first polymer and a second polymer to form a first material. The method comprises depositing the first material onto a carbon allotrope material disposed on a substrate to form a second material disposed on the substrate. In at least one aspect, the carbon allotrope material is a sheet material. The method comprises curing the second material. The substrate may be a component of a rotor blade, and the second material may be a layer having a thickness of between about 0.1 µm and about 10 µm after deposition, such as between about 1 µm and about 8 µm, such as between about 2 µm and about 6 µm, for example about 0.1 µm, about 1 µm, about 2 µm, about 3 µm, about 4 µm, about 5 µm, about 6 µm, about 7 µm, about 8 µm, about 9 µm, about 10 µm. The method may comprise dissolving the first polymer in a solvent before mixing the first polymer with the second polymer. The solvent comprises a xylene, a benzene, a toluene, dimethyl sulfoxide, water, or mixtures thereof.

In at least one aspect, a method for forming an electrically conductive material comprises mixing a carbon allotrope material, a first polymer and a second polymer to form a first material. The method comprises depositing the first material onto a carbon allotrope material to form a first material disposed on the carbon allotrope material, followed by curing the first material. In at least one aspect, the carbon allotrope material is a sheet material. The substrate may be a component of an airfoil, such as a rotor blade surface and/or rotor blade component, and the first material and/or second material comprises a layer having a thickness of between about 0.1 µm and about 10 µm after deposition, such as between about 1 µm and about 8 µm, such as between about 2 µm and about 6 µm, for example about 0.1 µm and about 10 µm after deposition, for example about 0.1 µm, about 1 µm, about 2 µm, about 3 µm, about 4 µm, about 5 µm, about 6 µm, about 7 µm, about 8 µm, about 9 µm, about 10 µm. The method may comprise dissolving the first polymer and/or second polymer in a solvent before mixing the carbon allotrope material, the first polymer, and the second polymer with each other. The solvent comprises a xylene, a benzene, a toluene, dimethyl sulfoxide, water, or mixtures thereof.

Methods of the present disclosure may comprise rinsing a first material and/or a second material with a rinsing agent. The rinsing agent comprises isopropyl alcohol, p-Toluenesulfonic acid, acetone, methanol, hydrates thereof, solvates thereof, or mixtures thereof. Rinsing may comprise spraying the rinsing agent onto a surface of the first material and/or second material for between about 1 second and about 10 minutes, such as between about 1 minute and 5 minutes. Rinsing may comprise spraying the rinsing agent onto a surface of a material of an amount of between about 1 mL and about 25 kL, such as between about 1 L and about 100 L, such as between about 1 L and about 5 L, for example about 1 L, about 2 L, about 3 L, about 4 L, about 5 L. Rinsing may comprise rinsing the first material and/or second material with a second rinsing agent that is isopropyl alcohol, p-Toluenesulfonic acid, acetone, methanol, hydrates thereof, solvates thereof, or mixtures thereof. In at least one aspect, the rinsing agent is p-Toluene sulfonic acid and is a mixture of 1 wt % p-Toluenesulfonic acid in butoxyethanol. The rinsing agent comprises a mixture of dinonylnaphthyl sulfonic acid and isopropylalcohol. In at least one aspect, rinsing comprises dipping the first material and/or the second material into the rinsing agent for between about 1 second and about 1 minute.

For methods described herein, curing the first material and/or the second material may comprise raising the temperature of the material to a peak curing temperature and maintaining the peak curing temperature for between about 1 second and about 48 hours, such as between about 1 hour and about 10 hours. The peak curing temperature may be between about room temperature and about 200° C., such as between about 50° C. and about 90° C., for example 50° C., 60° C., 70° C., 80° C., 90° C.

For methods described herein, depositing the first material and/or the second material onto the substrate may be achieved by spin-coating the first material onto a surface of a substrate, such as a component of a rotor blade, at a rate of between about 100 rpm and about 4,000 rpm, such as between about 500 rpm and about 2,000 rpm, for example about 500 rpm, about 1,000 rpm, about 1,500 rpm, about 2,000 rpm.

In at least one aspect, a method of resistively heating an airfoil and/or airfoil component, such as a rotor blade surface and/or rotor blade component, comprises applying a voltage to a surface of a material of the present disclosure that is disposed on an airfoil, such as a rotor blade surface and/or rotor blade component. Applying a voltage to a surface of a material of the present disclosure provides rapid surface heating (e.g., to about 250° F.) which provides reduced energy consumption for adequate deicing of one or more components of an airfoil, such as a rotor blade surface and/or rotor blade component. In at least one aspect, a heater is not present within the rotor blade. Furthermore, in at least one aspect, material of the present disclosure is disposed on a surface on or above the spar of the rotor blade, unlike the heaters of conventional rotor blades. This aspect provides facile repair of components of a rotor blade without involving substantial deconstruction of the rotor blade to repair, for example, a heater. A material may comprise a carbon allotrope material, a first polymer, a second polymer and/or sulfonic acid, as described above. Applying the voltage to the surface of the material at least partially melts solid water (ice) disposed on a surface of the rotor blade. The voltage may be an alternating current (AC) voltage of between about 10 Hertz and about 2000 Hertz, such as between about 500 Hertz and about 1,000 Hertz, for example 500 Hertz, 600 Hertz, 700 Hertz, 800 Hertz, 900 Hertz. The voltage may be an alternating current (AC) voltage of between about 10 volts and about 2000 volts, such as between about 50 volts and about 500 volts, for example about 50 volts, about 100 volts, about 200 volts, about 300 volts, about 400 volts, about 500 volts.

Materials of the present disclosure may be deposited onto a substrate, such as a surface of a rotor blade/rotor blade component, by any suitable deposition method, such as flow-coating, drop-casting, dipping, spraying, brush coating, spin coating, roll coating, doctor-blade coating, or mixtures thereof. Materials of the present disclosure may be deposited onto one or more surfaces of a rotor blade component, such as an inner surface (e.g., inner cavity or an inner surface of the outer erosion protection layer and/or an outer surface of a spar), an outer surface, or both, of a rotor blade component.

Polymer Syntheses, Characterization, and Property Measurements

Polymers, carbon allotrope material, and sulfonic acids of the materials of the present disclosure may be commercially available or may be synthesized. Commercially available polymers comprise PANI, PEDOT:PSS, polyurethanes, and epoxies, and may be obtained from, for example, Heraeus or SigmaAldrich. Polymers of the present disclosure may be synthesized by mixing a plurality of monomers to form a mixture, followed by applying heat to polymerize the monomers. One or more polymerization catalysts may be added to a mixture to promote increased molecular weight (Mn and/or Mw) of a formed polymer. "Mn" is a number average molecular weight, and "Mw" is a weight average molecular weight. Commercially available carbon allotrope material comprises carbon nanotube sheets. In at least one aspect, polymers are synthesized in any suitable solvent or solvent mixture, for example, n-butanol, n-hexanol, diethyl ether, or mixtures thereof.

When materials of the present disclosure are made of DNNSA as the sulfonic acid, the polyaniline, for example, produced has a high molecular weight (e.g., >22,000) and a moderate conductivity (10−5 S/cm) and exhibits high solubility in a variety of solvents. In at least one aspect, the conductivity of materials of the synthesized polymers may be enhanced by about 5 orders of magnitude by treatment/rinsing with quaternary ammonium salts or solvents such as methanol, acetone, isopropyl alcohol, p-toluenesulfonic acid, salts thereof, and mixtures thereof. Without being bound by theory, conductivity increases with rinsing due to removal of excess sulfonic acid, densification of the polymer, and a resultant increase in crystallinity.

Example Preparation of Polyaniline Dinonylnaphthalenesulfonic Acid Salt. One tenth of a mole of DNNSA (as a 50% w/w solution in 2-butoxyethanol) was mixed with 0.06 mol of aniline and 200 mL of water to form a milky white emulsion with 2-butoxyethanol. The emulsion was chilled to 5° C., mechanically stirred, and blanketed with nitrogen. Ammonium peroxydisulfate (0.074 mol in 40 mL of water) was added dropwise to the mixture over a period of about 1 hour. The reaction was allowed to proceed for about 17 hours, during which time the emulsion separated into a green 2-butoxyethanol phase and a colorless aqueous phase. The progress of the synthesis was monitored by pH, OCP (open circuit potential, mV), and temperature.

The organic phase was washed three times with 100-mL portions of water, leaving a dark green, highly concentrated polyaniline phase in 2-butoxyethanol. This concentrate was soluble in xylene, from which thin materials may be cast. Addition of acetone to a portion of the above concentrate resulted in the precipitation of the polyaniline salt as a green powder. After thorough washing of the powder with acetone and drying, elemental analysis indicated a stoichiometric ratio of sulfonic acid to aniline of 1:2.

The molar ratios of PANI:DNNSA in the synthesized polymers may be differed by adjusting the molar ratio of aniline to DNNSA in the starting mixture. For example, PANI:DNNSA salts may be prepared using DNNSA/aniline molar ratios of 1:1, 1:2, and 1:5 while the peroxydisulfate/aniline mole ratio may be kept constant at 1.23:1. DNNSA to Aniline mole ratio of 1.7 provides an Mw(SEC/viscosity) value of 31,250. DNNSA to Aniline mole ratio of 0.5 provides an Mw(SEC/viscosity) value of 25,300. DNNSA to Aniline mole ratio as low as 0.2 provides an Mw(SEC/viscosity) value of 5,690.

Molecular Weight Determinations. Molecular weight distribution averages may be determined by size exclusion chromatography (SEC). Chromatograms may be obtained with SEC systems, such as a model 150-CV SEC/viscometry (SEC/VISC) system (Waters Chromatography Inc.) and a multicomponent SEC system (Waters Chromatography Inc.) assembled from a model 590 pump, a model 712 autoinjector, a model 410 differential refractive index detector, and a model TCH column heater. Both SEC systems may be operated at 45° C. and employ a bank of two styragel SEC columns (Waters Chromatography Inc.) with mean permeabilities of 105 and 103 Å. UV-grade N-methylpyrolidone (NMP) (Burdick & Jackson Co.) modified with 0.02 M $NH_4HCO_2$ (Fluka Chemical Co.) may be used as the mobile phase and polymer solvent. A flow rate setting of 0.5 mL/min may be employed.

Calibration of the SEC may be performed with monodisperse polystyrene standards (Toya Soda Inc.) ranging in molecular weight from $1.1 \times 10^6$ to 2698. Intrinsic viscosities of the polystyrene calibrants may be measured using the SEC/viscometric detector. These values provide the Mark-Houwink expression for polystyrene in NMP/0.02 M $NH_4HCO_2$ at 45° C. for calibrating the size-exclusion chromatograph according to universal calibration:

$$[\eta] \; (dL/g) = (1.947 \times 10^{-4}) M^{0.66}$$

A linear least-squares fitting may be used to generate a universal calibration curve or a polystyrene-based molecular weight calibration curve. Mark-Houwink constants for polyaniline may be determined from the set molecular weight distribution averages and intrinsic viscosities calculated for individual data points of SEC/VISC chromatograms. Data acquisition and reduction may be provided by TRISEC software (Viscotek Corp.). Reported molecular weight distribution averages may be means of two determinations.

The SEC/VISC chromatograms for deprotonated polyaniline salts are typically unimodal, and nearly baseline resolution of the PANI and its sulfonic acid component is observed. The sulfonic acid components separate from the polyaniline peak and are not included in the molecular weight calculations. In at least one aspect, the polyaniline salts produce broad size-exclusion chromatograms, with Mw/Mn (polydispersity)>1.5. A Mark-Houwink (M-H) plot for PANI-DNNSA (1:2) is linear with R=0.671 and log K=−3.146.

Absorption. Absorption measurements may be made on a Cary 5000 spectrometer with the Universal Measurement Attachment (UMA) in air. Solution samples may be measured in a dilute solution of toluene in a 1 cm quartz cuvette. Sample rate may be between 1 nm and 2 nm depending on the breadth of wavelengths being studied. Solvent background should be obtained prior to sample measurement and later removed. Dry film measurements may be measured as spin-coated samples on glass slides, spin rate 1000 rpm for 30 s from solutions of xylene or toluene. A background transmission taken on a glass substrate should be measured. Samples should be oriented with the glass substrate side towards the light inlet, to minimize light scattering effects from uneven sample surfaces.

Resistance. Resistance measurements may be made using any suitable set of electrodes and measurement apparatus, such as a Keithley 4200 SCS. Preferably, resistance measurements are made using the van der Pauw method. The four-point method uses parallel source and sense measurements of current and voltage, respectively, across a sample surface. Current and voltage polarities are switched across each junction to test for ambipolarity. Sample geometry should be held constant and allows for the direct comparison of samples. In order to account for differences in the charge directionality, the current and voltage measurements are rotated across each possible arrangement, as shown in Table 1 and FIG. 1. FIG. 1 illustrates possible electrode arrangements for resistance measurements.

TABLE 1

Possible electrode arrangements for resistance measurements

| R | Source I | Sense V |
|---|----------|---------|
| $R_A$ | 1-2 | 3-4 |
| $R_B$ | 2-3 | 4-1 |
| $R_C$ | 3-4 | 1-2 |
| $R_D$ | 4-1 | 3-2 |

Van der Pauw resistance measurements are performed by forcing a current across two adjacent electrodes and sensing the voltage drop across the sample in a parallel arrangement of electrodes.

The sheet resistance may be calculated from the ratio of V to I from the measured material. In the case of a sample showing truly isotropic resistance, $R_A=R_B=R_C=R_D$. In the case of isotropic resistances, e.g., where $R_A=R_B$, the sheet resistance is determined by the average of the two measured resistances, as shown in Equation 1 below. For samples with anisotropic resistances (the x-direction and y-direction demonstrate different resistances), calculating the sheet resistance becomes more complicated, which will be addressed in the following paragraph. For all samples where $R_A \neq R_C$ and $R_B \neq R_D$, the measurement is void. Equation 2 shows how the bulk resistivity, ρ, is determined if the material thickness, d, is known (typically resistivity is reported in Ω·cm, thus includes the use of d in cm), which is derived from the original Van der Pauw theorem. Bulk resistivity, p, can then be used to calculate conductivity, σ(S·cm−1), which is inversely proportional (Equation 2).

$$R_S = \frac{R_A + R_B}{2} \qquad \text{Eqn. 1}$$

$$\rho = \frac{\ln(2)d}{\pi R_S} = \frac{1}{\sigma} \qquad \text{Eqn. 2}$$

Figure 2:
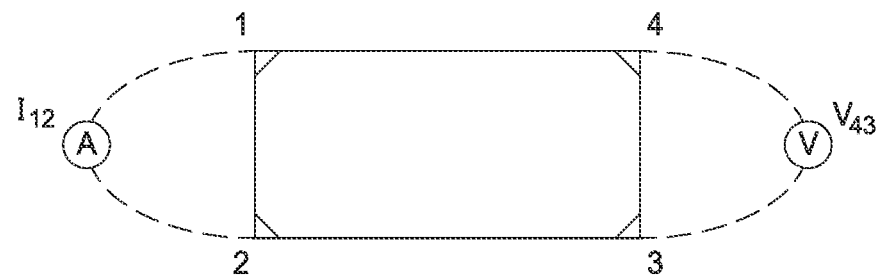
FIG. 2 illustrates possible electrode arrangements for resistance measurements, according to some aspects of the present disclosure.
Figure 2:
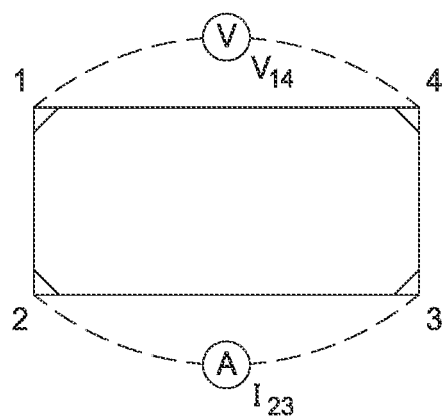
Figure 3:
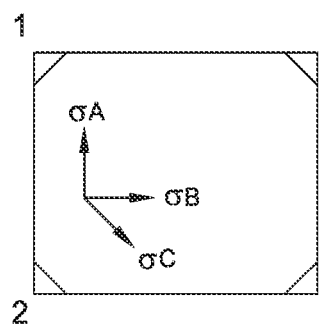
FIG. 3 illustrates an example van der Pauw measurement chip, according to some aspects of the present disclosure.
Figure 3:
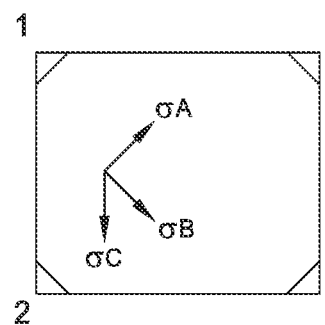

For cases where $R_A \neq R_B$, extracting conductivity values from the Van der Pauw equation becomes more difficult. In the case where the conductivity is not isotropic, the conductivity becomes a tensor value with x, y, and z dimensions. In the case of very thin materials, an accurate conductivity value may be obtained by taking the square of the product of the perpendicular conductivity measurement values, as shown in Equation 3 below. This calculation is only true if the directions being measured align with the tensor axes of the conductivity. It is assumed that the larger of the two resistances measured by the technique is exactly along the lowest conductivity tensor, and the lower of the resistance measurements is exactly along the highest conductivity tensor, as shown in FIG. 2. FIG. 2 illustrates an example van der Pauw measurement chip. If there were a misalignment of the conductivity tensor with the electrode/sample orientation, as shown in FIG. 2 right side, an inaccurate conductivity value would be measured.

$$\sigma = \sqrt{\sigma_A \cdot \sigma_B} \qquad \text{Eqn. 3}$$

For the van der Pauw measurement chip of FIG. 2, the numbers correspond to axis of the measurement while the sigmaX notations ($\sigma_A$, $\sigma_B$, and $\sigma_C$) represent the conductivity tensor directions. A mismatch of sample axis and tensor axis, as in the sample on the right, leads to inaccurately measured conductivities. The van der Pauw printed electrodes with the Keithley 4200 SCS provide a suitable device test bed for the measurement of samples.

In an effort to control the measurement humidity effects, a small sample probe station may be used to exclusively connect to the Keithley 4200 SCS for accurate van der Pauw measurements on the Dropsens prefabricated electrodes.

Electrochemical Impedance Spectroscopy (EIS). EIS uses a variable frequency alternating current source to probe the changes to a sample's impedance at different frequencies. Impedance, similar to a resistor, is the lag between an applied alternating current and the measured voltage change. Electrical circuit components respond in frequency dependent ways, which can be used to identify specific properties of a coating being measured. True ohmic resistors respond identically to direct current (DC) and alternating current (AC) sources, and thus show no frequency-dependent resistive response. Capacitors (as well as more complex electrical components) have a frequency-dependent response; at low frequencies the impedance is very high but at high frequencies the electrical impedance is lower. In the analysis of EIS data, a predicted model, known as the equivalence circuit model, is made composed of real and approximated electrical components to closely approximate the sample system. The model's calculated impedance spectra are then compared to the measured spectra.

The impedance response of the material and its combined response as a capacitor and resistor may be determined. For goodness of fit, the fits may be obtained using the Gamry built in spectral fitting software. The Gamry program uses a $\chi^2$ fitting equation, Eqn. 4.

$$\chi^2 = \Sigma[(Zmeas_{real} - Zfit_{real})^2 + (Zmeas_{imag} - Zfit_{imag})^2] \quad \text{Eqn. 4}$$

A perfectly matched predicted and measured impedance spectrum will result in $\chi^2=0$. In at least one aspect, a value of $\chi^2<10^{-4}$ is an acceptable "good fit". In at least one aspect, when comparing two different equivalent circuit models, a difference of less than one third of the value is deemed indistinguishable.

Polymer Materials

Materials of the present disclosure may be formed by depositing a first polymer and/or second polymer onto a carbon allotrope material disposed on an airfoil and/or airfoil component, such as a rotor blade surface and/or rotor blade component. In at least one aspect, the carbon allotrope material is a sheet of carbon allotrope material. Materials may also be formed by mixing a first polymer and a second polymer to form a first material. The first material may be deposited onto a carbon allotrope material disposed on an airfoil and/or airfoil component, such as a rotor blade surface and/or rotor blade component. The first material may be deposited onto an airfoil and/or airfoil component, such as a rotor blade surface and/or rotor blade component. Materials may also be formed by depositing a first polymer onto a carbon allotrope material disposed on an airfoil and/or airfoil component, such as a rotor blade surface and/or rotor blade component, to form a first material and depositing a second polymer onto the first material to form a second material. A sulfonic acid may also be mixed with the first polymer, second polymer, and/or carbon allotrope material. Materials of the present disclosure comprise materials that have been cured and/or washed with a rinsing agent such as isopropyl alcohol and/or p-Toluenesulfonic acid.

Materials of the present disclosure may be deposited onto a surface, such as a surface of an airfoil and/or airfoil component, such as a rotor blade surface and/or rotor blade component, by any suitable method, such as flow-coating, drop-casting, dipping, spraying, brush coating, spin coating, roll coating, doctor-blade coating, or mixtures thereof. The material may be cured before or after application to an airfoil surface. For example, a material may be deposited onto a rotor blade component and/or rotor blade surface. Once deposited, the material may be heated at about 70° C. for about 3 to about 4 hours to cure the material. A higher temperature may be used to accelerate the curing process. Curing promotes evaporation of one or more solvents in the material, such as xylenes, toluene, and/or water.

Microstructure and Material Thickness. Material thickness may be measured with white light interferometry, from a cut step height. Material surface microstructure may be observed with any suitable 3D laser scanning confocal microscope, such as a Keyence VK-X.

Example 1

PANI:DNNSA disposed on a rotor blade: Polyaniline DNNSA in xylene was painted onto the exterior surface of a rotor blade and dried using a heat gun. The coated surface was rinsed with isopropanol to promote increased conductivity of the film. Silver ink was applied at the opposite edges of the coating for an electrical connection. Copper tape was applied to the silver contacts to provide connection to an AC power source with alligator clips. The resistance across the film was initially measured at 340 ohms, however the resistance jumped to 10K ohms after application of 100 V AC. Measurement values are shown in Table 2.

TABLE 2

| | PANI-DNNSA | | |
|---|---|---|---|
| Variac Setting | Voltage, AC (60Hz) | Current (mA) | Power (W) |
| 10 | 15.11 | 0.93 | .014 |
| 20 | 29.67 | 2.05 | .061 |
| 30 | 44 | 3.24 | .143 |
| 40 | 57.6 | 4.55 | .26 |
| 50 | 72 | 5.96 | .429 |
| 60 | 86.4 | 7.73 | .668 |
| 70 | 100.8 | 11.32 | 1.14 |

Example 2

PEDOT:PSS disposed on a rotor blade: Seven coats of a PEDOT:PSS formulation were brush applied to the exterior of a rotor blade with drying between coatings with a heat gun. Silver ink was applied at the opposite edges of the coating for electrical connection and copper tape used as a contact to the silver for electrical connections. The resistance across the film was initially measured at 23.5 Ohms. Measurement values are shown in Table 3.

TABLE 3

| | PEDOT:PSS | | |
|---|---|---|---|
| Variac Setting | Voltage, AC (60Hz) | Current (A) | Power (W) |
| 10 | 15.11 | .22 | 3.32 |
| 20 | 29.67 | .47 | 13.94 |
| 30 | 44 | .48 | 21.12 |
| 40 | 57.6 | .60 | 34.56 |
| 30 | 44 | .41 | 18.04 |
| 20 | 29.67 | .26 | 7.71 |
| 10 | 15.11 | .13 | 1.96 |
| 30 | 44 | .41 | 18.04 |

The copper tape was removed from the silver contacts and a direct connection to the power source was made with alligator clips. Measurement values are shown in Table 4 (and were obtained with the temperature of the film measured with a thermocouple).

TABLE 4

PEDOT Direct to Silver Contacts

| Time | Variac Setting | Voltage, AC (60Hz) | Current (A) | Power (W) | Temperature (C.) |
|---|---|---|---|---|---|
| 12:09 | 30 | 44 | .44 | 19.36 | 34.3 |
| 12:10 | 30 | 44 | .44 | 19.36 | 39.5 |
| 12:12 | 30 | 44 | .44 | 19.36 | 42.9 |
| 12:14 | 30 | 44 | .44 | 19.36 | 44.7 |
| 12:15 | 30 | 44 | .44 | 19.36 | 46.8 |
| 12:20 | 30 | 44 | .44 | 19.36 | 48.9 |
| 12:27 | 30 | 44 | .45 | 19.36 | 49.5 |
| 12:28 | 30 | 44 | .44 | 19.36 | 48.6 |
| 12:29 | 40 | 57.6 | .63 | 35.14 | 48.9 |
| 12:31 | 40 | 57.6 | .61 | 35.16 | 55.3 |
| 12:34 | 40 | 57.6 | .51 | 29.38 | 56.7 |
| 12:39 | 40 | 57.6 | .48 | 27.65 | 60 |
| 12:46 | 40 | 57.6 | .47 | 27.07 | 57.6 |
| 12:57 | 40 | 57.6 | .46 | 26.50 | 55.8 |
| 1:07 | 40 | 57.6 | .45 | 25.92 | 53.2 |
| 1:07 | 30 | 44 | .33 | 14.52 | 51.9 |
| 1:14 | 30 | 44 | .33 | 14.52 | 46.1 |
| 1:24 | 30 | 44 | .33 | 14.52 | 41.4 |
| 2:26 | 30 | 44 | .33 | 14.52 | 44.2 |
| 2:26 | 20 | 30 | .21 | 6.3 | 42.6 |
| 2:31 | 20 | 30 | .21 | 6.3 | 38.2 |

Example 3

PANI:DNNSA+Carbon nanotube sheet: A carbon nanotube sheet was obtained from General Nano Corp., product ID GN-N8-LD10. Polyaniline dinonylnapthalene sulfonic acid (PANI-DNNSA) was synthesized as described above. Silver ink (AG530) was obtained from Conductive Compounds Corp. and used for electrical connections. 8663HS Polyurethane Protective Tape was obtained from 3M Company.

Resistance Measurements: 2.5 cm×2.5 cm squares of carbon nanotube sheet were coated with 0.5 ml PANI-DNNSA solution using a micropipette to carefully cover the area. The polymer solution provided a uniform coating. Silver ink was brush applied to opposite ends of the sheet for electrical contacts. The coated sheet was dried at 60° C. in a convection oven in air. Resistances of the sheets were calculated from current vs. voltage curves generated using a Keithley 4200-SCS system.

Electrical Heating: A 21 cm×7.5 cm piece of carbon nanotube sheet was placed over the top of 1 mm thick fiberglass panel. PANI-DNNSA solution was drop cast over the CNT sheet and silver ink was applied to opposite ends of the sheet. The panel was air dried at 90° C. Polyurethane tape was then applied to the coated panel as a protective layer. Power was applied to the panel using an automatic on-off timer (422ARR100S0X, Automatic Timing and Controls Co.) at selected intervals. A Variac Power source at 60 Hz was cycled 30 s on and 60 s off with Timer. Voltage applied and current measured were measured simultaneously with HP 34401A Multimeter. A fan was mounted to blow air directly onto the panel to keep it from overheating.

Figure 4:
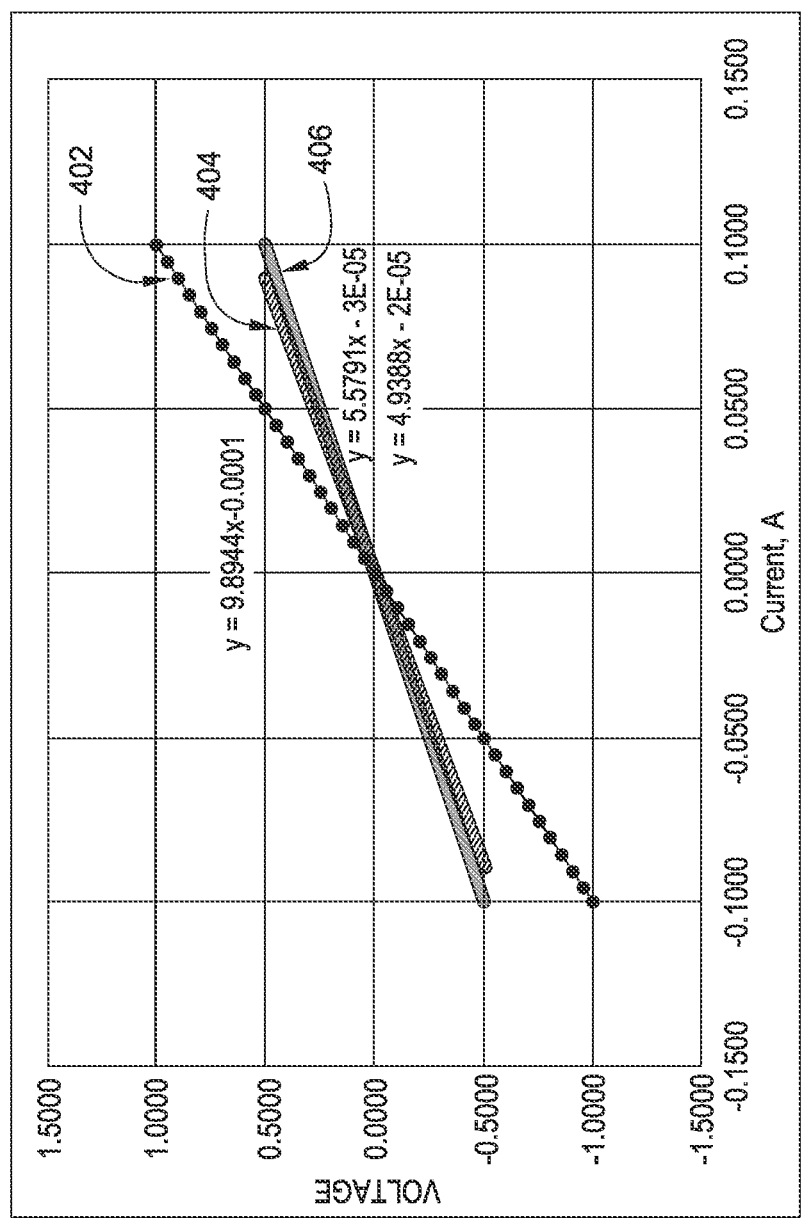
FIG. 4 illustrates current vs. voltage curves for carbon nanotube materials, according to some aspects of the present disclosure.

FIG. 4 illustrates current vs. voltage curves for carbon nanotube materials, according to some aspects of the present disclosure. As shown in FIG. 4, graph 400 shows current vs. voltage curves for carbon nanotube sheet alone (line 402), PANI-DNNSA coated carbon nanotube sheet (line 404) and PANI-DNNSA coated carbon nanotube sheet washed with IPA (line 406). The results show a linear ohmic response and a significant (e.g., 2-fold) increase in conductivity/decrease in resistivity of materials made of carbon nanotube sheet coated with PANI-DNNSA (5.6 ohms/square) (line 404) versus carbon nanotube sheet alone (9.9 ohms/square) (line 406). The 21 cm×7.5 cm panel prepared as described above (line 404) had a resistance of 13.8 ohms. With a voltage of 27.8 volts AC applied to the panel, the current draw was 2.18 A or 60.6 Watts power (0.38 W/cm$^2$ or 2.7 W/in$^2$). In addition, washing a material with IPA provides a further increase in conductivity/decrease in resistivity (4.9 ohms/square) (line 406) versus unwashed PANI-carbon nanotube (5.6 ohms/square) (line 408). A second 2.5 cm×2.5 cm PANI-DNNSA carbon nanotube sample was prepared on a polycarbonate substrate. A resistance of 5 ohms/square was measured showing reproducibility of the method. Overall, PANI-DNNSA has been incorporated into a carbon nanotube sheet yielding a conductive and flexible system with improved electrical and mechanical properties versus PANI-DNNSA or carbon nanotube sheet alone. A material comprising PANI-DNNSA-carbon nanotube sheet was demonstrated generating 2.7 W/in$^2$ that achieved temperatures between about 51° C. and about 62° C. in 30 seconds. Furthermore, washing a PANI-DNNSA-carbon nanotube sheet material with water does not dedope the DNNSA from the material. Indeed, sensitivity to humid conditions inhibits commercial viability of prior known materials as electrostatic dissipative materials for vehicle applications.

These materials may be disposed on an airfoil, such as a rotor blade component and/or rotor blade surface.

Comparative Example

PANI-carbon nanotube-HCl: PANI-carbon nanotube-HCl was prepared by in situ polymerization of aniline in an acidic solution bath (1 M HCl) with ammonium persulfate as the oxidant in the presence of the carbon nanotube sheet. The weight ratio between the sheet and aniline was 1:5, and the molar ratio between the aniline monomer and the oxidant is 1:1. DC-electrical conductivity of a CNT alone was found to be 342+/−37 S/cm, whereas PANI-carbon nanotube sheet-HCl provides a conductivity of 621+/−10 S/cm. Rinsing the material with water significantly alters the electrical properties of the material, further hindering the commercial viability of such a material. Furthermore, HCl is volatile at some curing temperatures and temperatures typically experienced by a surface of a rotor blade component, which also significantly alters the electrical properties of the material, further hindering the commercial viability of such a material.

Example 4

PANI:DNNSA+polyurethanes: Materials of the present disclosure comprises any suitable electrically conductive polymer(s) disposed on and/or in a carbon allotrope material. The material of Example 4 is shown in Table 5. Part A is a polyol with two or more hydroxyl groups. Part B is an isocyanate containing two or more isocyanate groups. Part C is PANI/DNNSA diluted with xylene and/or toluene to a percent solids of about 8%.

TABLE 5

|  |  | solid weights (g) | Actual Weights (g) | % of Material |
|---|---|---|---|---|
| Polyol | Part A | 3.497792 | 7.92 | 49.97% |
| Isocyanate | Part B | 0.697792 | 1.58 | 9.97% |
| PANI:DNNSA | Part C | 2.804 | 6.35 | 40.06% |
| in Toluene |  |  |  |  |
| Total Wgt |  | 7.000 | 15.850 |  |

Mixing procedure for Example 4: PANI:DNNSA concentrate is diluted in xylene or toluene to a % solids of about 8% to form Part C. Part C is mixed with Part A thoroughly to make a uniform solution with substantially no aggregates or particles to form a Part A/Part C mixture. Part B is then added to the Part A/Part C mixture and mixed thoroughly. Although PANI:DNNSA concentrate of Example 4 is diluted in xylene or toluene to a % solids of about 8%, In at least one aspect, a polymer is present in a solvent to a % solids of between about 0.1 wt % and about 30 wt %, such as between about 1 wt % and about 15 wt %. Isocyanates comprise aryl isocyanates, aliphatic isocyanates, and cycloaliphatic isocyanates. In at least one aspect, isocyanates comprise toluene diisocyanate (TDI), methylene diphenyl diisocyanate (MDI), 1,6-hexamethylene diisocyanate (HDI), and mixtures thereof. Polyols comprise aryl polyols, aliphatic polyols, and cycloaliphatic polyols. In at least one aspect, polyols comprise C1-C15 polyol. In at least one aspect, Part A and Part B are synthesized or obtained commercially from Aptek (e.g. Aptek 2100), Huntsman Corporation (e.g., Huntsman 5750), BASF, Bayer AG, etc.

The material may be disposed on a surface of a rotor blade component. The material is drop cast onto a carbon allotrope material to form a second material disposed on a substrate surface, such as a surface of a rotor blade component. Additionally or alternatively, the material may be disposed on the carbon allotrope material by flow-coating, dipping, spraying, brush coating, spin coating, roll coating, doctor-blade coating, or mixtures thereof. Once applied, the material is heated at about 70° C. for between about 3 to about 4 hours to cure the material. In at least one aspect, a higher temperature may be used to accelerate the curing process.

Curing the material promotes evaporation of the solvent (toluene, xylene, etc.) and controlled crosslinking of the polymers with suitable void space left by a solvent.

Figure 5:
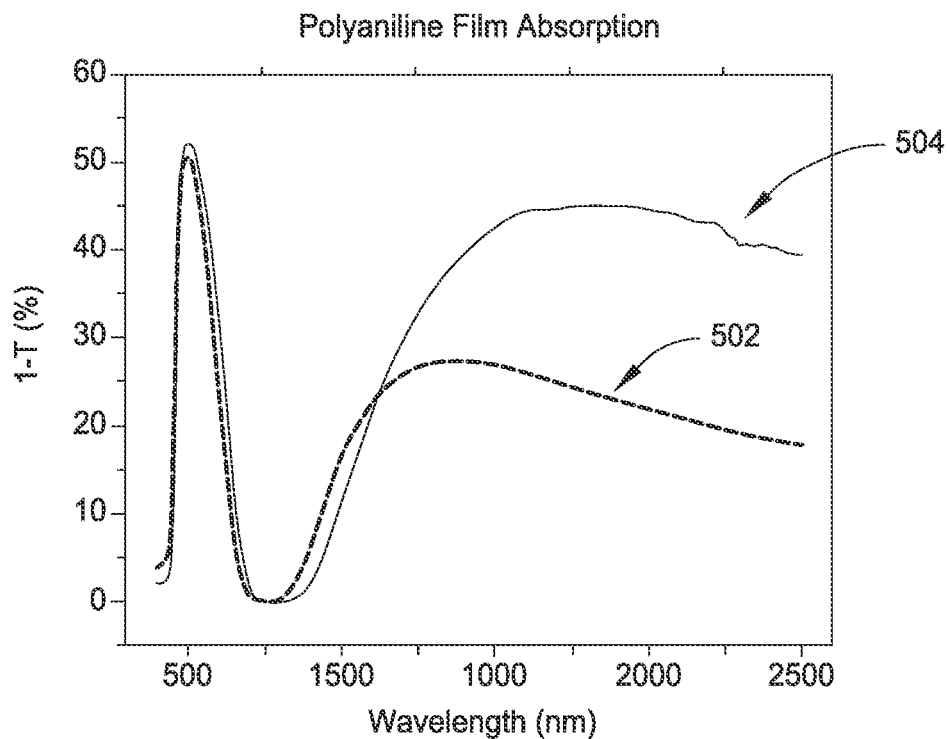
FIG. 5 illustrates absorptance of PANI materials in the visible and near infrared regions, according to some aspects of the present disclosure.

FIG. 5 illustrates absorptance of PANI materials in the visible and near infrared regions. Line 502 shows the apsorptance of a material comprising PANI:DNNSA:PTSA, while line 504 shows the apsorptance of a material comprising PANI:DNNSA. As shown in FIG. 5, the sharp peak at about 500 nm (of line 502 and line 504) corresponds to the bipolaron absorption while the broad absorption from about 1000-2500 nm results from infrared absorption by mobile holes. PANI's sharp peak at about 500 nm is attributed to a polaron having a DNNSA counterion. The free carrier part of the spectrum, e.g. the sigmoidal part that moves into the infrared region, is called the free carrier tail which is associated with conductivity of the polymer. A lower free carrier tail (or absence of a free carrier tail) indicates that a polymer has low (if any) conductivity. As shown in FIG. 5, the free carrier tail of a material comprising PANI:DNNSA: PTSA (line 502) is lower than the free carrier tail of a material comprising PANI:DNNSA (line 504) in the absence of PTSA.

Materials of doped-PANI (e.g., line 504) differ from that of the solution (in the absence of doped-PANI) by the inclusion of a very broad spectral feature in the infrared window, e.g. the carrier tail. The bipolaronic absorption feature in the visible region originates from the same structural entities of that in the solution absorption albeit blue-shifted by about 0.45 eV. Without being bound by theory, this shifting may be due to interchain interactions, including parallel alignment of the chromophore dipole on adjacent polymer chains leading to H-like aggregation (which may be determined by emission spectroscopy).

In at least one aspect, these materials are disposed on an airfoil component and/or airfoil surface, such as a rotor blade component and/or rotor blade surface.

In at least one aspect, these materials are disposed on and/or in carbon allotrope material, such as carbon nanotubes, graphenes, fullerenes, polycarbonates, and combinations thereof, to form a second material with improved electrical and mechanical properties. The second material is disposed on an airfoil component and/or airfoil surface, such as a rotor blade component and/or rotor blade surface.

Example 5

PEDOT:PSS in acrylate polymer: PEDOT:PSS is a polymer system that is soluble in polar solvents, such as water and DMSO. This solubility provides water soluble dispersions with second polymers such as epoxies and/or polyurethanes.

The resistance of Example 5 starts off close to 500Ω/□ and drops to almost 100Ω/□ by the third layer while remaining very thin. This material provides electrostatic dissipative applications with a low loading of PEDOT:PSS. The concentration of the PEDOT:PSS can be increased to further lower the resistance of the material. In at least one aspect, a material comprises between about 0.1% by weight (wt) and about 50 wt % of PEDOT:PSS, such as between about 1 wt % and about 25 wt %, such as between about 1 wt % and about 10 wt %, for example about 5 wt %.

Figure 6:
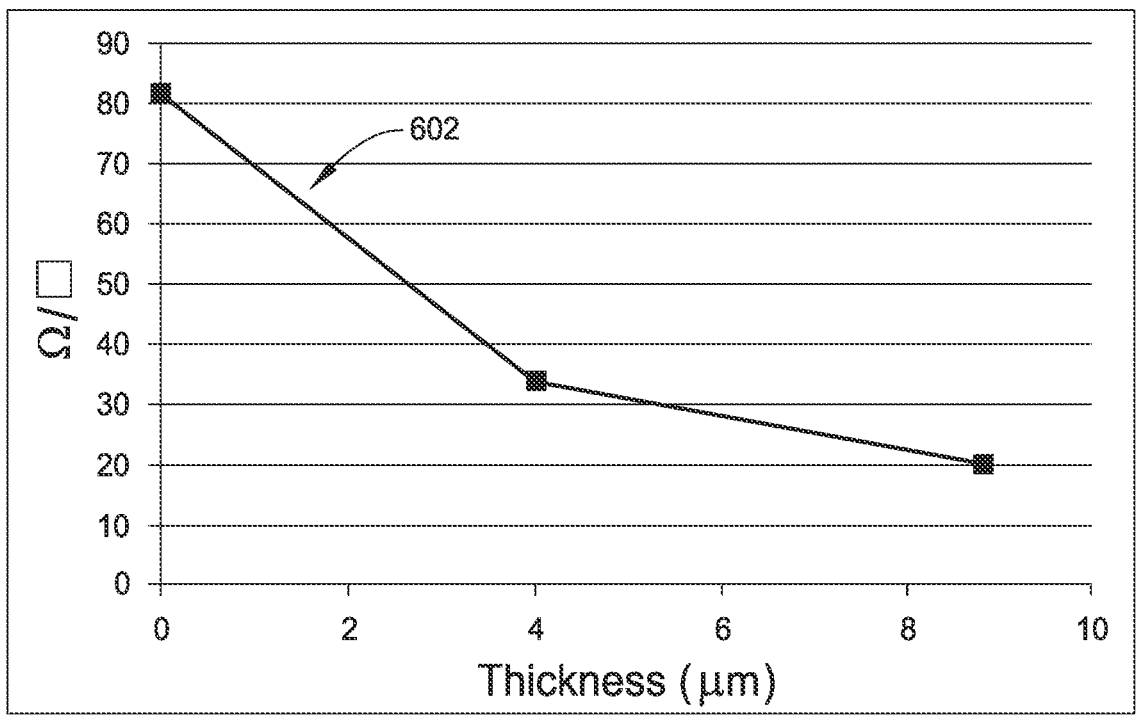
FIG. 6 illustrates resistance versus thickness of a PEDOT:PSS material, according to some aspects of the present disclosure.

FIG. 6 illustrates resistance versus thickness of a PEDOT:PSS material. As shown in FIG. 6, the resistance of the PEDOT:PSS (line 602) starts off low at about 70-80Ω/□ with a dark blue material and decreases upon increasing thickness to about 20Ω/□ with a dark blue material at a thickness of about 6 μm.

In at least one aspect, these materials are disposed on an airfoil component and/or airfoil surface, such as a rotor blade component and/or rotor blade surface.

In at least one aspect, these materials are disposed on and/or in carbon allotrope material, such as carbon nanotubes, graphenes, fullerenes, polycarbonates, and combinations thereof, to form a second material with improved electrical and mechanical properties. The second material is disposed on an airfoil component and/or airfoil surface, such as a rotor blade component and/or rotor blade surface.

Rinse to Reduce Resistance

Materials of the present disclosure may be rinsed, for example, after deposition onto a surface and before or after curing, with one or more rinsing agents. Rinsing agents comprise isopropyl alcohol (IPA), p-Toluenesulfonic acid, acetone, methanol, salts thereof, and mixtures thereof. In at least one aspect, a material is coated onto a substrate and dipped into a solution containing one or more rinsing agents. In at least one aspect, a rinse comprises spraying a rinsing agent on a surface of a material deposited on a substrate, such as a rotor blade component or rotor blade surface. In at least one aspect, a rinsing agent is sprayed onto a surface of a material for between about 1 second and about 10 minutes, such as between about 30 seconds and about 2 minutes. In at least one aspect, a rinsing agent is sprayed onto a surface of a material in an amount of between about 1 mL and about 25 kL, such as between about 100 L and about 1 kL. In at least one aspect, a material having a higher resistance may be suitable for an application and, therefore, rinsing with a rinsing agent may be excluded. For example, resistance of an unrinsed PANI:DNNSA or PANI:DNNSA:Carbon nanotube coating(s) may be sufficient for a particular use, and the unrinsed PANI:DNNSA or PANI:DNNSA:carbon nanotube coating(s) may still be cured.

An IPA rinse, for example, removes some of the excess sulfonic acid, such as DNNSA. Sulfonic acid removal promotes increased contact between polymer chains of the material and reduced resistance of the material. Rinse with a rinsing agent further promotes solubility of the material in a variety of solvents. The increased solubility facilitates deposition of the material onto a substrate because less solvent may be used for deposition as compared to unrinsed materials. A reduced amount of solvent for deposition provides faster curing times and reduced costs of production.

EIS has been used to help quantify the effects of rinsing with a rinsing agent on PANI material impedance. The capacitive nature of the material decreased with additional rinsing (e.g., dipping) and was lowest for materials dipped in IPA and then PTSA/PTSAM solutions. Materials comprising PANI:DNNSA incorporated into epoxy materials and carbon nanotubes with rinsing showed promise as conductive materials. In addition, PEDOT:PSS can be incorporated at even lower loadings (than typical PANI:DNNSA) to make conductive materials.

Example 6

Figure 7A:
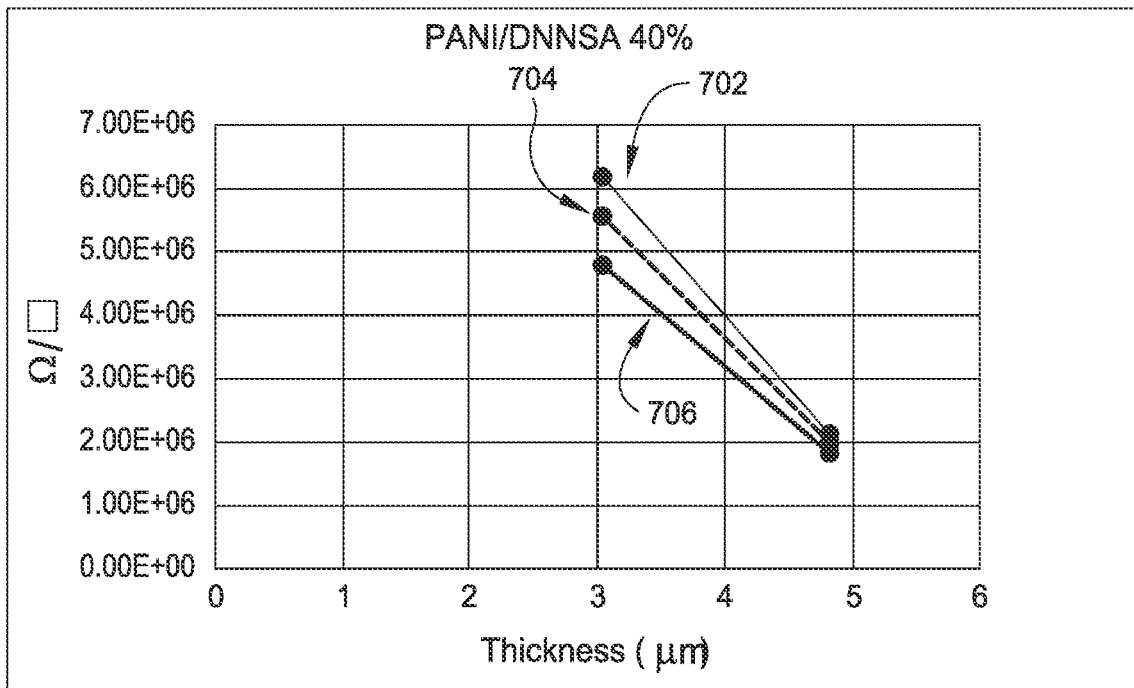
FIG. 7A illustrates resistance versus material thickness for PANI:DNNSA 40% in polyurethane, according to some aspects of the present disclosure.
Figure 7B:
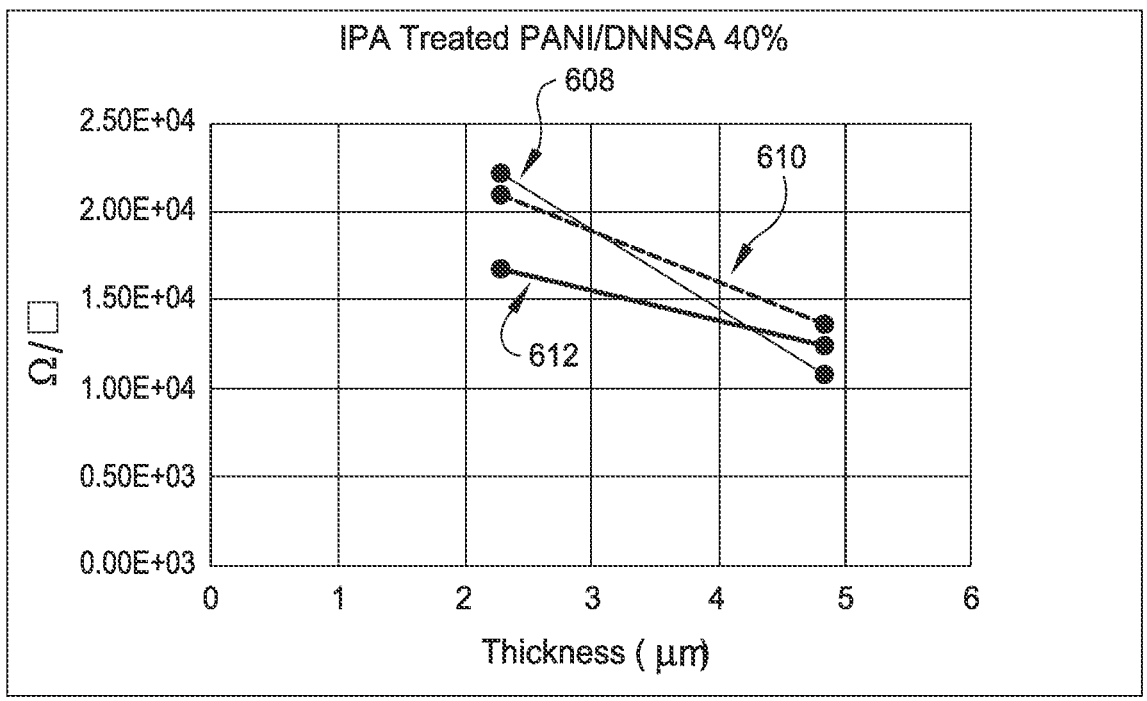
FIG. 7B illustrates resistance versus material thickness for PANI:DNNSA 40% wt in polyurethane rinsed with IPA, according to some aspects of the present disclosure.

PANI:DNNSA 40% wt in polyurethane Rinsed with IPA: FIG. 7A illustrates resistance versus material thickness for PANI:DNNSA 40% in polyurethane, while FIG. 7B illustrates resistance versus material thickness for PANI:DNNSA 40% wt in polyurethane rinsed with IPA. As shown in FIG. 7A, resistance of the materials for PANI:DNNSA 40% in polyurethane that were not rinsed with IPA (lines 702, 704, and 706) were in M Ω/☐ at thickness between about 3 μm and about 5 μm. However, as shown in FIG. 7B, the resistance of the materials after IPA rinse (lines 708, 710, and 712) reduces substantially with the IPA wash to k Ω/☐ between thicknesses of about 2 μm and about 5 μm. As shown in FIGS. 7A and 7B, resistance of the materials (lines 702, 704, 706, 708, 710, and 712) also reduces with increasing material thickness.

In at least one aspect, these materials are disposed on an airfoil component and/or airfoil surface, such as a rotor blade component and/or rotor blade surface.

In at least one aspect, these materials are disposed on and/or in carbon allotrope material, such as carbon nanotubes, graphenes, fullerenes, polycarbonates, and combinations thereof, to form a second material with improved electrical and mechanical properties. The second material is disposed on an airfoil component and/or airfoil surface, such as a rotor blade component and/or rotor blade surface.

Example 7

Figure 8:
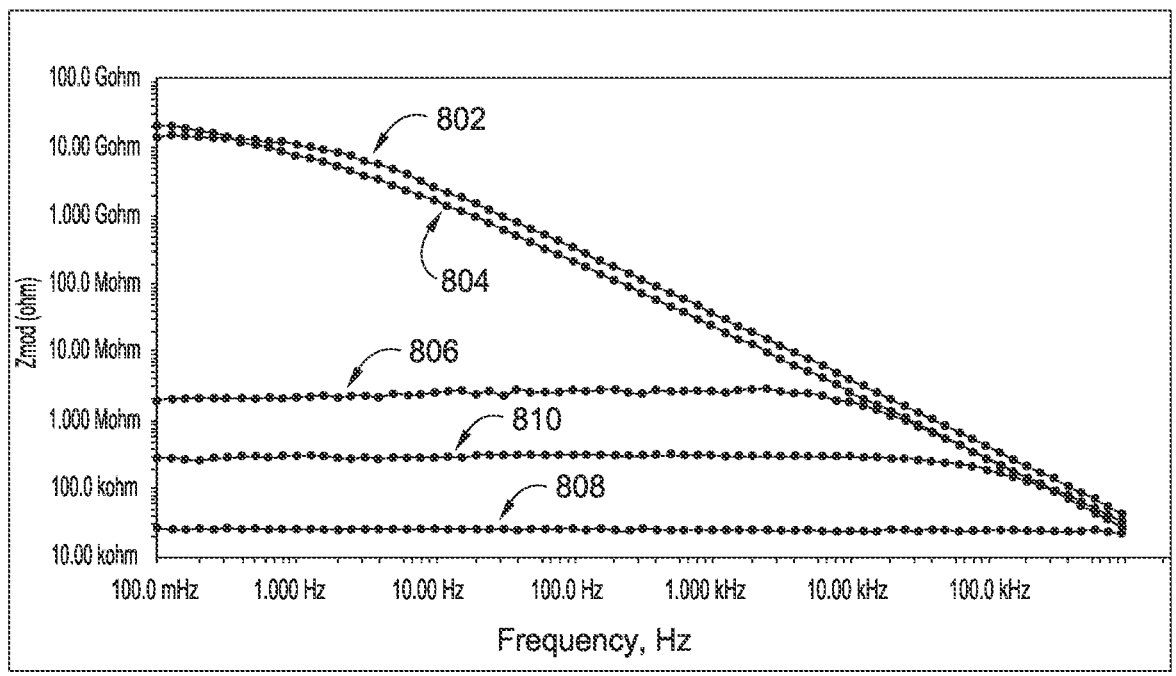
FIG. 8 illustrates a Bode plot of impedance spectra plotted as impedance versus frequency for a neat PANI:DNNSA material, according to some aspects of the present disclosure.

PANI:DNNSA rinsed with various rinsing agents: FIG. 8 illustrates a Bode plot of impedance spectra plotted as impedance versus frequency for a neat PANI:DNNSA material. The data for FIG. 8 was determined by EIS. Dipping treatments consisted of submersion into the noted rinsing agent or secondary dopant treatment for 10 s each. As shown in FIG. 8, impedance is highest for unrinsed PANI:DNNSA (line 802) and PANI:DNNSA rinsed with p-Toluenesulfonic acid (PTSA) (line 804). PANI:DNNSA rinsed with IPA (line 806) provides a material with reduced impedance as compared to the materials of lines 802 and 804. Furthermore, PANI:DNNSA sequentially rinsed with IPA, air dried and then rinsed with a solution of 1% PTSA/PTSAM in butoxyethanol (line 808) provides lower impedance than PANI:DNNSA sequentially rinsed with a solution of 1% PTSA/PTSAM in butoxyethanol, air dried and then rinsed with IPA (line 810), as well as the materials of lines 802, 804, and 806.

As shown in FIG. 8, the high impedance (y axis in Ohms) measured for PANI:DNNSA materials is analogous to the high DC resistivity. For the unrinsed sample (line 802), which each of the materials begins as, the impedance drops substantially with increased frequency, which is characteristic of the leaky capacitor model (trickle through current limited by the high R regions between highly crystalline regions).

The change of the material impedance from acting as a resistor and leaky capacitor to a purely resistive system is consistent with the observation that the dipping is creating a more interconnected polymer system (instead of isolated PANI crystal islands) and, accordingly, a lower resistance to electron transfer between areas of PANI, as shown in FIG. 8. The shrinking distance between highly conductive regions of PANI thus reduces the Rp value fit to the EIS data. This is further supported by considering the material shrinkage (thickness) that occurs with secondary dipping, e.g. IPA followed by PTSA.

One sample not included in FIG. 8 is that of a material dipped in a solution of DNNSA in IPA which measured a very low (~1 Ohm) and flat impedance. This would make the material very conductive and responding purely as a conductor with no CPE character. While the material was more conductive than its undipped precursor, it was not substantially better as EIS would suggest.

Figure 9:
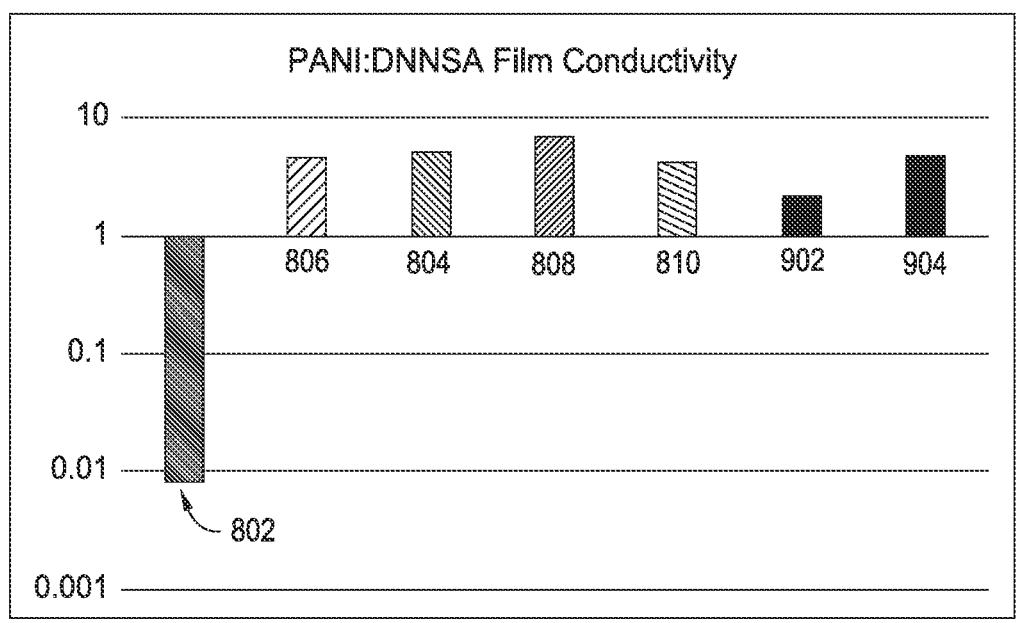
FIG. 9 is a bar graph illustrating relative conductivity of PANI:DNNSA materials cast on interdigitated electrodes and treated with a rinsing agent, according to some aspects of the present disclosure.

FIG. 9 is a bar graph illustrating relative conductivity of PANI:DNNSA materials cast on interdigitated electrodes and treated with a rinsing agent. As shown in FIG. 9, unrinsed PANI:DNNSA (bar 802) has a low conductivity as compared to PANI:DNNSA rinsed with IPA (bar 806), PANI:DNNSA rinsed with PTSA (bar 804), PANI:DNNSA rinsed with IPA followed by PTSA (bar 808), PANI:DNNSA rinsed with PTSA followed by IPA (bar 710), PANI rinsed with a mixture of DNNSA and IPA (bar 902), and a Thymol rinse (bar 904).

In at least one aspect, these materials are disposed on an airfoil component and/or airfoil surface, such as a rotor blade component and/or rotor blade surface.

In at least one aspect, these materials are disposed on and/or in carbon allotrope material, such as carbon nanotubes, graphenes, fullerenes, polycarbonates, and combinations thereof, to form a second material with improved electrical and mechanical properties. The second material is disposed on an airfoil component and/or airfoil surface, such as a rotor blade component and/or rotor blade surface.

Overall, impedance and conductivity of materials of the present disclosure are tuned to a desired impedance and conductivity by applying a rinsing agent to a surface of a material.

Figure 10:
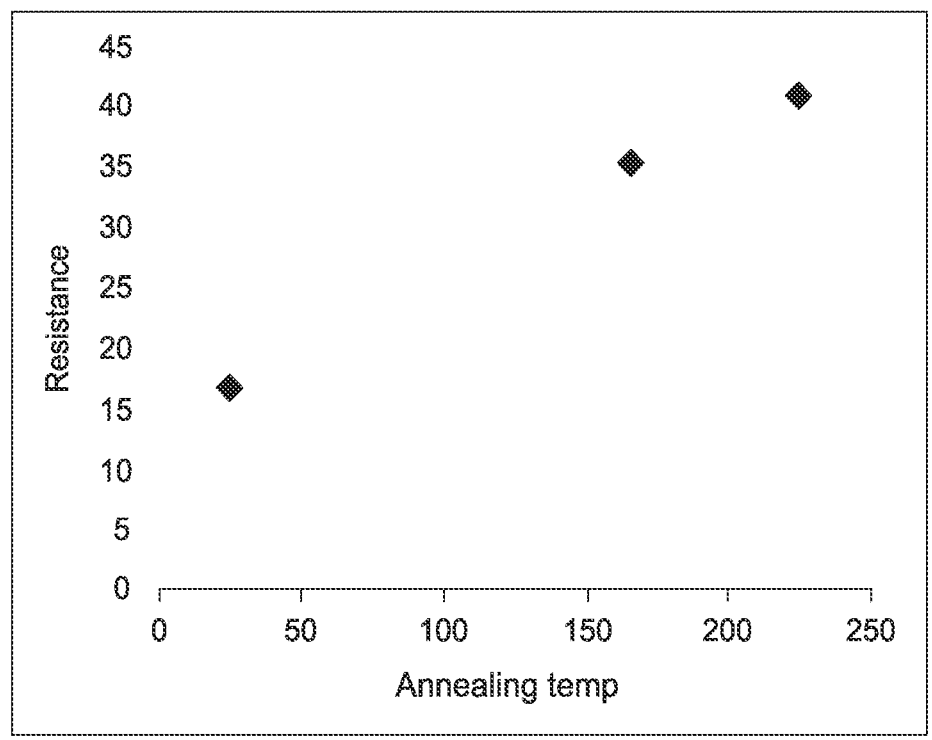
FIG. 10 illustrates resistance (in kOhms) versus annealing temperature for a PANIPOL material cast from toluene, according to some aspects of the present disclosure.

Comparative Example: PANIPOL and PANIPLAST. PANIPOL is a dodecylbenzene sulfonic acid (DBSA)- doped, highly conductive polymer (prior to material rinsing, unlike PANI:DNNSA) that is slightly soluble in toluene and may be used in polyurethane coatings. Materials comprising PANIPOL may be formed from dispersions of the polymer in toluene and xylene. The sheet resistances of these dispersions are 12.8 and 16.2Ω, respectively. The polymer is only slightly soluble in a number of solvents, such as xylenes and toluene, and thus casts a rough material onto a substrate. The roughness of the materials hinders "airworthiness" of PANIPOL materials because the materials are more susceptible to cracking, rendering underlying layers/substrate susceptible to chemical and UV damage. FIG. 10 illustrates resistance (in kOhms) versus annealing temperature for a PANIPOL material cast from toluene. As shown in FIG. 10, an increase in annealing temperature increases the resistance of a PANIPOL material (data points shown as solid diamonds).

Synthesis of PANIPOL may include isolating an insoluble and insulating powder of PANI:DBSA. Alternatively, synthesis of PANIPOL may include not crashing the polymer out of solution and casting materials of the dissolved polymer from p-xylene. Typically these materials measured a sheet resistance of several to hundreds of kΩ.

In one synthesis run in 2-butoxyethanol, similar to the PANI:DNNSA synthesis described above, the polymer was completely dried from solution (instead of crashing out of the xylene solution). However, these solids were found to be insoluble in a variety of solvents. Nonetheless, after being resuspended in a large amount of xylene and isolated by filtration, the material appeared similar to the commercially available PANIPOL and dispensed as a material which measured 14Ω.

The synthesized PANIPOL may be less conductive than the commercially available PANIPOL because crashing the polymer out of solution in water removes a critical amount of the counterion, DBSA. An alternate synthesis was designed around creating the polyaniline base and then redoping with DBSA. This synthesis led to a sufficiently conductive polymer paste. Conductivity values for these materials are shown in Table 6.

TABLE 6

Conductivity values for PANI-b to PANI:DBSA samples

| Sample | σ (Scm$^{-1}$) |
|---|---|
| 1 | 6.729 |
| 2 | 5.754 |
| 3 in toluene | 3.672 |

Commercially available PANIPOL is slightly soluble in toluene and can be isolated by suspending in toluene and decanting off the dissolved polymer. This solution was diluted and compared to the absorption of a very dilute and filtered solution of newly synthesized PANI:DBSA, as described above. PANIPOL absorbs at a higher energy than the newly synthesized PANI:DBSA. The absorption peak is also broader for the newly synthesized PANI:DBSA, indicative of a loss of dopant. The singly-doped polaron state introduces a lower energy absorption at $\Omega_1$ eV, as well as an optically allowed transition to a state at CB–$\Omega_1$, while the double-doped bipolaron, has a slightly higher energy absorption at $\Omega_1'$. Thus, when considering the absorption, it is plausible that the broadening to a lower energy transition in the PANI:DBSA fill is the conversion (dedoping) of some of the bipolaron transitions to single polarons. This would mean the material is losing DBSA and this may be the cause of the conductivity difference.

Efforts to rinse the PANI:DBSA materials were performed but only modest conductivity increases were observed, as shown in Table 7. Material treatment in water did show a significant change, which again may be due to removal of the DBSA which is soluble in water.

TABLE 7

Material treatments and resistance changes in PANI:DBSA materials. Note that the water dipped sample was on an otherwise high resistance material.

| Treatment | PTSA | PTSA/PTSAM | MeOH | H$_2$O |
|---|---|---|---|---|
| Conductivity Increase | 2.3x | 1.5x | 0.3x | 100x |

Similar to PANIPOL, PANIPLAST is a material of polyaniline and a polyamine/amide dopant. PANIPLAST also has limited solubility in ethylene glycol, xylene, water and methanol. PANIPLAST is a dispersion that is difficult to filter through a 0.25 micron filter. Coatings like PANIPLAST are conductive but need to be brush applied to a surface. A coating from a dispersion of 7.7 grams in 6.4 grams of water was applied to a 4"×6" panel and dried at 70° C. The PANIPLAST yielded a resistance between about 1 kOhms and about 2.2. kOhms.

Overall, the roughness of the deposited PANIPOL and PANIPLAST materials hinders "airworthiness" of these materials because the materials are more susceptible to cracking, rendering underlying layers/substrate susceptible to chemical and UV damage. Furthermore, rinsing PANIPOL materials only moderately decreases resistance of the materials and does not increase the density of the materials.

Example 8

Polyaniline into epoxy. Conventional surface coatings lack compatibility with underlying surfaces and/or a polymer mixed with other components of the surface coating. For example, epoxy resins have many desirable physical properties but are nonetheless reactive to a large number of nucleophilic compounds, such as anilines, such as PANI. Undesired reactivity results in precipitation and/or agglomeration of byproducts. It has been discovered that dissolution of a reactive species such as polyaniline in a compatible solvent promotes dispersibility which reduces undesired reactivity with reactive surfaces and/or a polymer, such as polyurethane, mixed with the reactive species. Dissolution of the reactive species promotes formation of a compatible, airworthy material that may be disposed onto a surface of a rotor blade component or onto and/or in a carbon allotrope material disposed on a rotor blade component. This aspect underscores surface coating compatibility with surrounding material in addition to having the desired physical properties for airworthiness. Suitable solvents for polyanilines comprise xylenes, toluene, benzene, and mixtures thereof. Suitable solvents for PEDOT:PSS comprise polar protic solvents such as water and DMSO.

Figure 11:
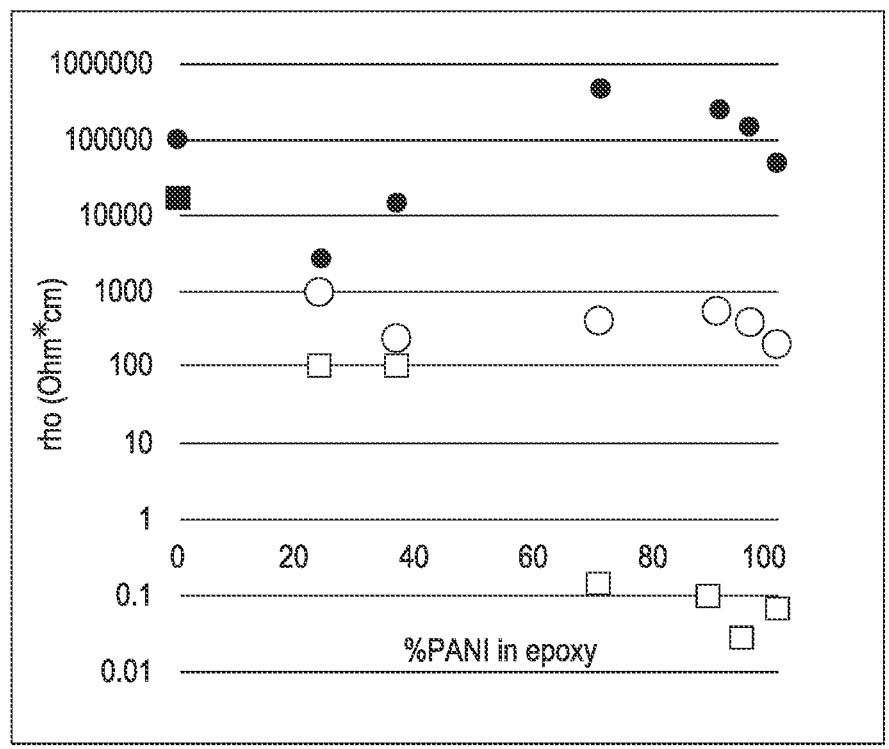
FIG. 11 illustrates resistivity of PANI:DNNSA in epoxy coating versus % PANI in epoxy and treated with various rinsing agents, according to some aspects of the present disclosure.

For example, PANI:DNNSA was incorporated into a high temperature cure epoxy resin epoxy. Solutions were manually mixed then placed in a Thinky mixer at 1000 rpm for 10 min. PANI:DNNSA was visibly crashing out of the epoxy solution (a very low viscosity solution). Solutions were dropcast onto 4-pt electrodes, with electrode spacing of 2 mm and length of 6 mm, and dried at 120° C. in air for an hour. Simple two point resistance measurements were made and the material thickness measured to calculate the material resistivity. FIG. 11 illustrates resistivity of PANI:DNNSA in epoxy coating versus % PANI in epoxy and treated with various rinsing agents. As shown in FIG. 11, resistivity of PANI:DNNSA:epoxy materials decreases from as-cast material (solid circles) to IPA dipped material (hollow circles), IPA dipped material followed by PTSA dip (solid squares), and IPA rinse followed by a second IPA rinse (hollow squares).

Prior to secondary treatments, PANI:DNNSA:epoxy materials show no obvious trend relating polymer loading to conductivity. Even at PANI:DNNSA loadings of ~20% with no secondary treatment, the conductivity may fall into a sufficient conductivity threshold for some electrostatic dissipative coatings. After dipping the materials in IPA, the materials provide a trend of increasing conductivity with increasing PANI:DNNSA loading.

Furthermore, a measurable conductivity was obtained for the epoxy coating containing no PANI after the PTSA dip, which is possibly due to ionic conductivity, as opposed to electrical conductivity.

PANI:DNNSA may be mobile in the cured epoxy coating. Material treatment, for example dipping, provides increased material conductivity. Without being bound by theory, the increased conductivity of the PANI:DNNSA:epoxy coatings may be due to removal of excess aniline, sulfonic acid and/or rinsing agent-induced changes to the microstructure of the deposited material.

An alternative method to temper the reactivity of polyaniline with epoxy comprises adding slowly to an epoxy surface, followed by a slow increase of curing temperature before reaching a final curing temperature. Overall reactivity between PANI:DNNSA with epoxy may be further controlled by peak curing temperatures and/or curing times.

These materials are disposed on an airfoil component and/or airfoil surface, such as a rotor blade component and/or rotor blade surface.

These materials are disposed on and/or in carbon allotrope material, such as carbon nanotubes, graphenes, fullerenes, polycarbonates, and combinations thereof, to form a second material with improved electrical and mechanical properties. The second material is disposed on an airfoil component and/or airfoil surface, such as a rotor blade component and/or rotor blade surface.

Example 9

Thermoplastics: PANI:DNNSA in Butvar B90 and PEDOT:PSS in Butvar B90: Butvar B90 is a tri-block polymer containing polyvinyl butyral (PVB), polyvinyl alcohol and polyvinyl acetate as shown below, where x, y, and z are each a positive integer.

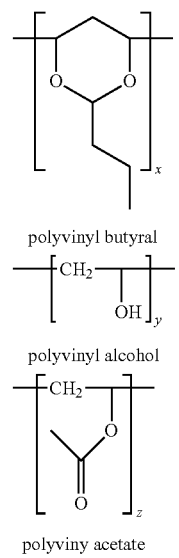

polyvinyl butyral polyvinyl alcohol polyviny acetate

Butvar B90 may be used as a base resin in thermoplastic coatings, as well as combined with thermoset material(s) to make thermoset resins. In Example 9, PVB was combined with PEDOT:PSS and PANI:DNNSA as surface resistance ($\Omega/\square$) and pencil hardness were measured. Several samples also included the addition of a reactive epoxy component (e.g., EPON 1007-CT-55: a diglycidyl ether Bisphenol A) that reacts with the alcohol group of Butvar B90, which adds strength to the coating.

Solutions of PVB were made by dissolving 10% wt PVB into a premade solution of 40/60 methanol/toluene. A Teflon coated metallic stir bar was added to the flat-bottomed jar and placed to stir at ambient temperature for 1-3 hours until dissolved.

Samples were prepared by adding PVB solution into a flask and then adding any EPON or $H_3PO_4$ mixing in a Thinky mixer or by vortexer and allowing it to set for 30 minutes. A specific loading of PANI:DNNSA was added, and the samples were vortex mixed. Samples were then made by painting the coating onto glass slides with a small paint brush.

Initial formulations were begun with PEDOT:PSS, which were all very high resistance coatings, but PANI:DNNSA was added to the B90/EPON/surfactant mixture at 20% by weight and measured a resistance of 3.3 M$\Omega$. In follow up studies, additional materials were tested. The materials tested are shown in Table 8 below.

TABLE 8

| | PVB, PANI:DNNSA | | | | | | | |
|---|---|---|---|---|---|---|---|---|
| Sample | PANI:DNNSA | PVB | EPON | $H_3PO_4$ | Surface Resistance ($\Omega/\square$) | Pencil Hardness[a] | Color | Appearance |
| 1 | 0.185 | 0.357 | 0.357 | 0.100 | 156000 | 0 | Green | translucent, orange peel |
| 2 | 0.000 | 0.900 | 0.000 | 0.100 | 5000000 | 3 | Clear | translucent, orange peel |
| 3 | 0.500 | 0.400 | 0.000 | 0.100 | 9300 | 0 | Green | opaque, bumpy |

TABLE 8-continued

PVB, PANI:DNNSA

| Sample | PANI:DNNSA | PVB | EPON | H₃PO₄ | Surface Resistance (Ω/□) | Pencil Hardness[a] | Color | Appearance |
|---|---|---|---|---|---|---|---|---|
| 4 | 0.500 | 0.000 | 0.400 | 0.100 | NA | NA | NA | |
| 5 | 0.000 | 0.500 | 0.500 | 0.000 | 5000000 | 3 | White | opaque, bumpy |
| 6 | 0.500 | 0.000 | 0.500 | 0.000 | 712000 | 0 | Green | semiopaque |
| 7 | 0.246 | 0.754 | 0.000 | 0.000 | 48750 | 3 | Green | translucent, rough |
| 8 | 0.000 | 0.000 | 0.900 | 0.100 | NA | NA | NA | |
| 9 | 0.500 | 0.500 | 0.000 | 0.000 | 43750 | 0 | Green | opaque, rough |
| 10 | 0.250 | 0.000 | 0.750 | 0.000 | 389500 | 0 | Green | semiopaque, smooth glossy |

[a] = pencil hardness: the letter designation scale has been changed to a numerical scale (0-14). Pencil hardness results fell into either too soft to measure on the scale, a '0', or a '3'.

Thus, hardness of materials of the present disclosure may be tuned by comprising polyvinyl butyral in one or more materials, further improving "airworthiness" of materials such as surface coatings due, at least in part, to increased hardness of the materials. In at least one aspect, materials of the present disclosure comprise about 25 wt % PANI:DNNSA and about 75 wt % polyvinyl butyral, such as Butvar B90. In at least one aspect, materials of the present disclosure comprise about 6% PANI:DNNSA in polyvinyl butyral, with no EPON or phosphoric acid.

These materials are disposed on an airfoil component and/or airfoil surface, such as a rotor blade component and/or rotor blade surface.

These materials are disposed on and/or in carbon allotrope material, such as carbon nanotubes, graphenes, fullerenes, polycarbonates, and combinations thereof, to form a second material with improved electrical and mechanical properties. The second material is disposed on an airfoil component and/or airfoil surface, such as a rotor blade component and/or rotor blade surface.

Example 10

Polyethylenedioxythiophene:Polystyrene sulfonate (PEDOT:PSS) in a sol-gel: PEDOT is a conductive polymer with a high intrinsic conductivity. It may be used as an electron-selective transport material in organic photovoltaics and may be used in coatings for static dissipation. For Example 10, commercially available PEDOT:PSS was incorporated into Boegel, a glycidyl-Si—Zr-containing sol-gel adhesion-promoting pretreatment for, for example, Alclad surfaces.

PEDOT:PSS was added and mixed on a vortex mixer to newly combined prepared solutions of the solgel. In some higher loading of PEDOT:PSS the solgel rapidly gelled, indicating a reaction between the epoxy moieties of the solgel and the conductive polymer.

Figure 12:
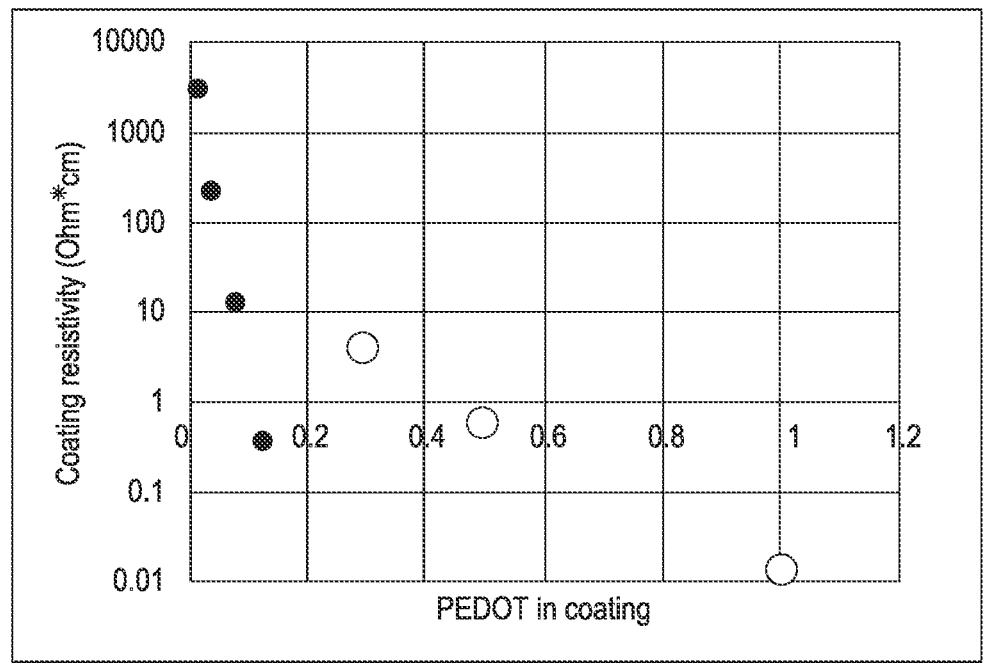
FIG. 12 illustrates resistivity of PEDOT:PSS materials at different amounts of PEDOT:PSS in a material, according to some aspects of the present disclosure.

FIG. 12 illustrates resistivity of PEDOT:PSS materials at different amounts of PEDOT:PSS in a material. As shown in FIG. 12, resistivity of an epoxy-based material (solid circles) reduces sharply as the amount of PEDOT:PSS is increased. Resistivity of a sol-gel based material (Boegel) also decreases with increased PEDOT:PSS content (hollow circles), but the decrease is not as sharp as compared to the epoxy-based materials.

There are several observable trends in the data: (1) PEDOT:PSS loaded epoxy shows measureable conductivity at much lower loading thresholds (demonstrating a sub 16% IPN.). (2) Pure PEDOT has a conductivity approaching 100 S/cm. (3) The PEDOT:PSS formulations require no secondary treatments (such as IPA rinse) and also show a much lower loading threshold for creating conductive coatings.

These materials are disposed on an airfoil component and/or airfoil surface, such as a rotor blade component and/or rotor blade surface.

These materials are disposed on and/or in carbon allotrope material, such as carbon nanotubes, graphenes, fullerenes, polycarbonates, and combinations thereof, to form a second material with improved electrical and mechanical properties. The second material is disposed on an airfoil component and/or airfoil surface, such as a rotor blade component and/or rotor blade surface.

Surfactants and PEDOT:PSS in Epoxy: A high temperature cure epoxy resin was used to test the efficacy of several commercial dispersants to disperse PEDOT:PSS. A comparison between samples of PEDOT:PSS with loading levels ranging from 0.1% to 2.0% in epoxy containing a Lubrizol Solplus R700 dispersant to samples with no dispersant. The PEDOT:PSS in all samples was observed to phase separate, yet the Solplus containing samples showed a dramatic reduction in particle aggregation. Samples containing Solplus R700 were less resistive, particularly at low loading levels.

A comparison between dispersants at a single PEDOT:PSS loading level (1.0%): The dispersants being compared are all from Lubrizol Solplus, R700, R710 and DP700. Samples were prepared as described above (Example 8). Samples with R700 and R710 showed the best PEDOT:PSS dispersion (visually) while R710 had the lowest resistance (6.73 MΩ/□). For aqueous PEDOT:PSS solutions, R710 is sufficient to dispersing the polymer in organic-phase coating resins.

A polymer blend that gives higher conductivity as as-cast materials was also investigated: PANI:DNNSA-PTSA with epoxy. These samples were prepared with loading levels of 0.02-0.2% and none had measureable resistances.

These materials are disposed on an airfoil component and/or airfoil surface, such as a rotor blade component and/or rotor blade surface.

These materials are disposed on and/or in carbon allotrope material, such as carbon nanotubes, graphenes, fullerenes, polycarbonates, and combinations thereof, to form a second material with improved electrical and mechanical properties. The second material is disposed on an airfoil component and/or airfoil surface, such as a rotor blade component and/or rotor blade surface.

Multilayer Stacks

Aspects of the present disclosure comprise materials deposited onto a substrate as multiple layers to form a multilayer stack. In at least one aspect, a multilayer stack provides a lower overall electrical resistance as compared to a single layer of the same material and thickness. A multilayer stack may also provide increased strength of the overall coating/surface of, for example, a rotor blade component.

A multilayer stack may comprise one or more polymer layers, each layer independently selected from PANI:DNNSA, PEDOT:PSS, polyurethanes, acrylates, polyvinyl butyrals, and mixtures thereof. The one or more layers comprise a sulfonic acid, such as DNNSA. The one or more layers comprise a carbon allotrope material, such as carbon nanotubes, graphenes, fullerenes, polycarbonates, and combinations thereof.

A multilayer stack may also provide one or more conductive layers for use as a heating layer, e.g. deicing applications, as explained in more detail below. In at least one aspect, a multilayer stack comprises an outer protective layer disposed over an electrically conductive layer. As used herein, the term "outer" layer includes a layer having no additional layer deposited onto the outer layer, the outer layer being the layer directly exposed to the environment.

Example 11

Multilayer stack: Example 11 is 4-layer multilayer stack where each layer is PANI:DNNSA that is rinsed with IPA after deposition of each layer. Thicknesses and surface resistance values for the multilayerstack after each deposition and rinsing are shown below in Table 9. Resistances below 100Ω/□ were achieved with the IPA treated samples.

TABLE 9

Average Resistance and thickness measurements for neat and IPA treated PANI/DNNSA.

| | | Sample 1 | Sample 2 | Sample 3 | Sample 4 |
|---|---|---|---|---|---|
| Layer 1 | Thickness (μm) | 17.034 | 13.7914 | 15.9964 | 15.2887 |
| | Resistance (Ω/□) | 5.37E+07 | 5.08E+07 | 5.68E+07 | 3.07E+07 |
| Layer 1 after IPA wash | Thickness (μm) | 9.6941 | 9.8854 | 9.6468 | 8.93 |
| | Resistance (Ω/□) | 3.35E+01 | 3.20E+01 | 2.77E+01 | 3.18E+01 |
| Layer 2 | Thickness (μm) | 94.234 | 65.024 | 57.404 | 38.862 |
| | Resistance (Ω/□) | 1.40E+07 | 1.79E+07 | 1.03E+07 | 1.36E+07 |
| Layer 2 after IPA wash | Thickness (μm) | 89.916 | 26.924 | 32.766 | 22.098 |
| | Resistance (Ω/□) | 1.31E+01 | 1.26E+01 | 1.31E+01 | 1.28E+01 |
| Layer 3 | Thickness (μm) | 108.204 | 52.07 | 57.912 | 44.704 |
| | Resistance (Ω/□) | 3.85E+06 | 3.43E+06 | 5.16E+05 | 1.50E+06 |
| Layer 3 after IPA wash | Thickness (μm) | 100.838 | 37.846 | 48.768 | 40.132 |
| | Resistance (Ω/□) | 1.33E+04 | 6.82E+03 | 1.69E+04 | 2.57E+04 |
| Layer 4 | Thickness (μm) | 136.906 | 67.31 | 75.184 | 72.39 |
| | Resistance (Ω/□) | 8.08E+04 | 4.87E+04 | 8.48E+04 | 1.35E+05 |
| Layer 4 after IPA wash | Thickness (μm) | 108.966 | 44.45 | 51.054 | 64.008 |
| | Resistance (Ω/□) | 5.70E+02 | 5.70E+01 | 7.33E+01 | 1.80E+02 |

In at least one aspect, the one or more layers comprises a carbon allotrope material, such as carbon nanotubes, graphenes, fullerenes, polycarbonates, and combinations thereof. In at least one aspect, a multilayer stack is disposed on an airfoil component and/or airfoil surface, such as a rotor blade surface and/or a rotor blade component.

Material Applications

Non-limiting examples for uses of materials of the present disclosure comprise uses as a thermoplastic and/or as a component of prepreg material. For prepreg material, materials of the present disclosure may be disposed on and/or in fiber materials composed of graphite, fiberglass, nylon, Kevlar® and related materials (for example, other aramid polymers), polyethylenes, among others. A prepreg material may be disposed on a rotor blade component.

Materials of the present disclosure may be deposited onto a carbon allotrope material to form a second material that is deposited onto a surface of a substrate, such as a rotor blade component and/or rotor blade surface. Furthermore, flow-coating, spray-coating, and spin-coating processes provide material application to complex blade tip shapes, which is lacking using typical heaters.

Deposition includes, but is not limited to, flow-coating, dipping, spraying, brush coating, spin coating, roll coating, doctor-blade coating, and mixtures thereof. Materials of the present disclosure are deposited to form a layer on a substrate, such as a layer on a surface of a rotor blade component and/or rotor blade surface, at a range of thicknesses, such as between about 0.1 μm and about 20 mm, such as between about 1 μm and about 10 μm, such as between about 1 μm and about 8 μm, such as between about 2 μm and about 6 μm. Material thickness is utilized to tune conductivity and resistance of a deposited material. Material thickness may also be utilized to further tune "airworthiness" properties (such as rain erosion and resistance to sand and hail damage) of the material and resulting coated substrate.

After a material is deposited onto a substrate, the material is cured at any suitable temperature, e.g. to evaporate solvent. Curing may be performed using any suitable curing apparatus. For curing, a temperature of the material may be raised gradually to a peak curing temperature at which the peak curing temperature remains constant for a period of time. A peak curing temperature may be between about room temperature and about 200° C., such as between about 70° C. and about 150° C. Materials may be cured for a period of time of between about 1 second and about 48 hours, such as between about 1 minute and about 10 hours.

Spraying to deposit a material on an airfoil component and/or airfoil surface: One or more polymers and/or carbon allotrope material are mixed with a suitable solvent (e.g., xylenes, toluene, water, etc.) and sprayed on an airfoil, such as a rotor blade component and/or rotor blade surface, until a sufficient layer thickness is achieved to obtain a desired surface resistance. The solvent may then evaporate at room temperature (or higher) forming a cured material layer on a surface of a rotor blade component and/or rotor blade surface.

Figure 13:
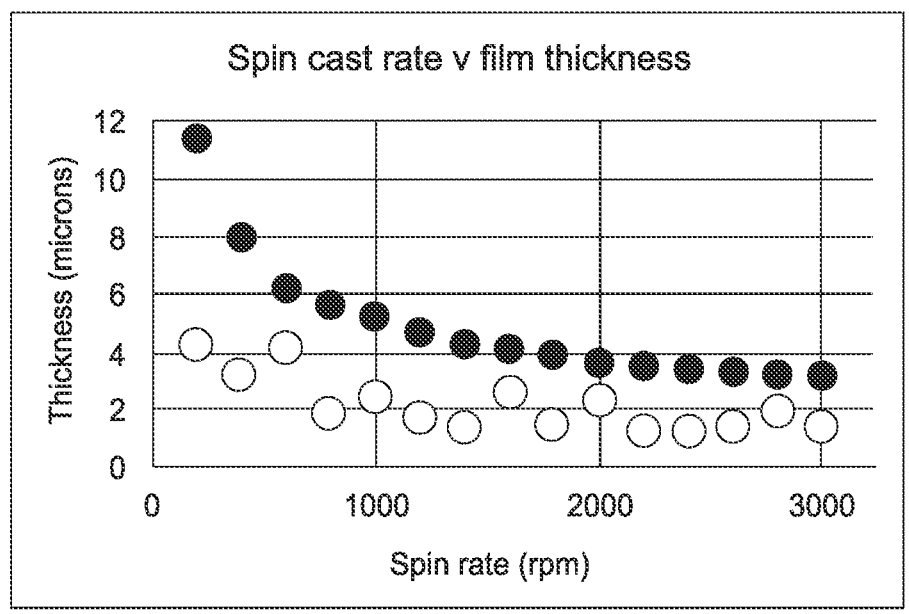
FIG. 13 illustrates spin rate versus material thickness, according to some aspects of the present disclosure.

Spin Coating to deposit a material onto an airfoil component and/or airfoil surface: Material thickness is utilized to fine tune conductivity and resistance of a deposited material by, for example, spincoating PANI:DNNSA sheet onto substrates, such as airfoils, such as rotor blade components and/or rotor blade surfaces, at different chuck rotations. FIG. 13 illustrates spin rate versus material thickness. As shown in FIG. 13, untreated materials (solid circles) are highly dependent on the casting spin rate. Interestingly, the difference in final material thickness diminishes after the materials have been treated (dipped in rinsing agent) (open circles). In at least one aspect, materials of the present disclosure are deposited by spin coating at a spin rate of between about 100 rotations per minute (rpm) and about 4,000 rpm, such as between about 1,000 rpm and about 3,000 rpm. In at least one aspect, a material is made of a carbon allotrope material.

Figure 14:
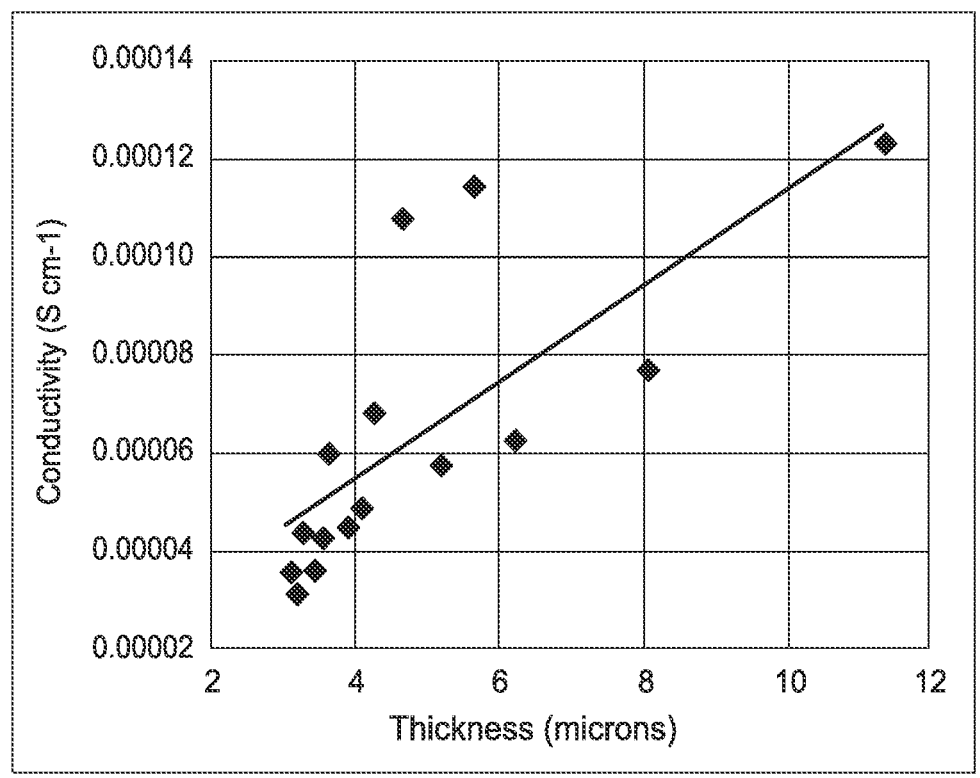
FIG. 14 illustrates conductivity versus thickness of as-deposited PANI:DNNSA films onto a substrate, according to some aspects of the present disclosure.

FIG. 14 illustrates conductivity versus thickness of as-deposited PANI:DNNSA films onto a substrate. Conductivity was again measured as a square resistance adjusted for the measurement dimensions. As shown in FIG. 14, conductivity has a linear trend as it increases with increasing thickness of the deposited material (data points shown as solid diamonds). Furthermore, a lack of correlation between conductivity and thickness for rinsing agent-treated (e.g., IPA rinse) samples was also observed (not shown in FIG. 14). In at least one aspect, a material is made of a carbon allotrope material. In at least one aspect, these materials are deposited by spin coating onto a carbon allotrope material.

Deicing: After depositing one or more materials of the present disclosure onto an airfoil component and/or airfoil surface, such as a rotor blade component and/or rotor blade surface, and curing, and assembly of subsequent/additional airfoil components (if any), such as rotor blade components, to form the airfoil, the airfoil may be "deiced" if, for example, harsh weather conditions have resulted in accumulation of ice on one or more airfoil components. Because materials of the present disclosure are conductive, application of a voltage to a surface containing the material (or to a surface near the material) will result in increased temperature of an outer surface of the airfoil, such as a rotor blade, and melt a portion of the ice accumulated on the outer surface. In at least one aspect, the conductive material layer is an electrode. Additionally or alternatively, an electrode is attached to the conductive material layer. In at least one aspect, a voltage is applied to a surface of an airfoil component and/or airfoil surface, such as a rotor blade, the surface containing one or more materials of the present disclosure. The voltage applied to the airfoil surface provides complete melting of ice accumulation on the surface. In at least one aspect, a voltage is applied to a surface of an airfoil, such as a rotor blade, the airfoil containing one or more materials of the present disclosure to provide partial melting of ice accumulation on the surface such that the partially melted ice accumulation slides off of the airfoil.

In at least one aspect, deicing comprises contacting any suitable AC/DC voltage generator with a surface of an airfoil component and/or airfoil surface, such as a rotor blade component and/or rotor blade surface, the airfoil containing one or more materials of the present disclosure to provide a voltage to the one or more materials. Contacting an AC voltage generator, for example, with a surface of an airfoil containing one or more materials (as a resistor) of the present disclosure provides resistive heating of at least the surface and may provide resistive heating of one or more layers of a an airfoil component. In at least one aspect, deicing comprises providing voltage to a surface of an airfoil, such as a rotor blade, containing one or more materials of the present disclosure by electrically generating components of an aircraft. For example, an aircraft engine, such as a rotorcraft engine, is switched to the active mode and the AC power provided by the engine transmits to a surface of the airfoil which deices one or more surfaces of the airfoil components/surfaces of the aircraft. These aspects provide intrinsic deicing of an aircraft without a need to apply an external voltage generator to an airfoil component/surface.

In at least one aspect, methods comprise providing an AC voltage to a surface at between about 10 Hertz and about 2000 Hertz, such as between about 200 Hertz and about 600 Hertz, for example about 400 Hertz. In at least one aspect, methods comprise providing an AC voltage to a surface at between 10 volts and about 2000 volts, such as between about 100 volts and about 400 volts, for example about 200 volts. Methods comprise adjusting the AC voltage with one or more transformers. Methods comprise adjusting the AC voltage into DC voltage with one or more rectifiers. Methods comprise adjusting the DC voltage into AC voltage with one or more oscillators.

Radome and other electrostatic dissipation: In an aircraft, a radar is present behind the nose of the aircraft. The nose often times builds up a form of static electricity known as precipitation static (P-static), which causes electrostatic interference with the radar in addition to brush discharge events causing damage to a coating on the outer surface of the aircraft. Electrostatic interference with the radar results in communication interference between the aircraft and the control tower on the ground as well as interference with detection of other aircraft in the sky. P-static further causes electrostatic interference with other components of an aircraft, for example, components that contain antenna(s). Furthermore, static charge often builds inside of a fuel tank of an aircraft which may affect fuel tank function.

If the aircraft is a fighter jet, for example, the canopy of the fighter jet often builds static charge, which causes static interference of radar(s) and antenna(s).

After depositing one or more materials of the present disclosure onto an airfoil component/surface (and optional curing), the one or more materials electrostatically dissipate static electricity (e.g., on the rotor blade and/or other aircraft components) such as P-static accumulated at a location on the aircraft, such as a nose of the aircraft. The electrostatic dissipation of static electricity provides reduced or eliminated electrostatic interference with a radar of the aircraft and reduced or eliminated brush discharge events resulting in reduced or eliminated damage to a coating on an outer surface of an aircraft. Materials of the present disclosure further provide reduced or eliminated electrostatic interference with other components of an aircraft, such as components that contain antenna(s).

Airworthiness: In addition to an inability to dissipate charge buildup and deice surfaces, conventional coatings are not otherwise "airworthy". For example, performance as to durability parameters such as rain erosion, resistance to UV light, resistance to high temperature, resistance to low temperature, and resistance to sand and hail damage are insufficient for conventional surface coatings on a surface of a rotor blade such. Materials of the present disclosure are "airworthy" and improve upon one or more parameters of airworthiness (as compared to conventional coatings) such as rain erosion, resistance to UV light, resistance to high temperature, resistance to low temperature, resistance to sand and hail damage, improved flexibility, and improved visibility.

Overall, materials of the present disclosure provide thin material layers having low resistance/high conductivity, providing materials applicable for use as deicing materials for airfoils, such as rotor blades. These robust materials permit a location of a heater within, for example, a rotor blade to be closer to the rotor blade outer surface. In at least one aspect, a heater is not present in a rotor blade. As the distance between the heater and the outer surface decreases, power demand of the heater also decreases. A decreased power demand provides an increased fatigue life of components and materials of the rotor blade. Indeed, the local power reduction can be reduced by up to about 40% in at least one aspect by moving the heater from the typical location in the laminate to the surface. This can reduce spar laminate temperatures significantly, providing curing to be optional for the airfoil (e.g., at high temperatures, such as 350° F.), thus improving manufacturing and ballistic tolerance of airfoils, such as rotor blades. In addition to reducing the power demand, the location of materials of the present disclosure closer to an outer mold line in the blade than typical heaters permits facile repair/maintenance of the materials. The erosion protection layer(s) can be removed, exposing the material. The chemistry of the material permits new material to be disposed on (painted/sprayed) onto, for example, a spar, thus restoring de-icing functionality.

Materials of the present disclosure further provide tailored conductivity for desired heat distribution. Materials of the present disclosure further provide removal and replacement of an attached durable coating/material such as a wear-resistant material layer. Furthermore, conventional materials disposed on a spar, for example, are many thousandths of an inch thick, which can hinder bondability of a material to, for example, an erosion protection layer. In at least one aspect, materials of the present disclosure are thinner than conventional materials disposed on or within a spar and do not have to be situated beneath the blade spar, unlike a conventional de-ice heater.

In addition, if a conventional coating is mixed with additional chemicals to improve one or more desired physical properties of the coating, such as conductivity, the coating is often incompatible with the additional chemicals, negating desired physical properties of the additional chemicals added to the coating. Conventional coatings are also often incompatible with underlying surfaces/coatings leading to adhesion degradation at the coating-coating interface. In addition to the aforementioned applications and benefits, materials and methods of the present disclosure provide controlled formation of electrostatically dissipative, airworthy materials.

Materials and methods of the present disclosure provide low resistance materials (rinsed in a variety of rinsing agents), due at least in part to the removal of excess sulfonic acid and a densification of the material increasing the electrical percolation. Contrary to results using DNNSA, removal of excess DBSA prior to material casting leads to high resistance materials.

PANI and PEDOT:PSS show promise as conductive polymers that can be formulated into materials deposited onto a rotor blade component. Materials of the present disclosure containing PVBs (polyvinyl butyrals) are robust, easy to work with, meet electrostatic dissipative resistances, and are versatile to apply.

Furthermore, as compared to conventional ionic based coatings, materials and methods of the present disclosure provide reduced surfactant leach out over time in part because amounts of surfactant are reduced in the materials of the present disclosure as compared to conventional ionic based coatings. In addition, sulfonic acids of the present disclosure leach from the formulations to a much lesser extent than conventional surfactants of conventional ionic based coatings.

Materials of the present disclosure further provide viability in humid environments, viability at elevated temperatures, improved electrical properties and mechanical properties (e.g., improved flexibility) as compared to known materials.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope of the described aspects. The terminology used herein was chosen to, for example, best explain the principles of the aspects, the practical application or technical improvement over technologies found in the marketplace, or to enable others of ordinary skill in the art to understand the aspects disclosed herein.

As used herein, "carbon allotrope material" includes a material made of carbon capable of having two or more different three dimensional molecular configurations, such as, for example, nanotubular, planar, or spherical three dimensional molecular configuration.

As used herein, a "sheet material" includes a carbon allotrope material with a substantially planar dispersion.

As used herein, the term "material" includes, but is not limited to, mixtures, reaction products, and films/layers, such as thin films, that may be disposed onto a surface, such as a surface of a rotor blade component.

As used herein, "unsubstituted" includes a molecule having a hydrogen atom at each position on the molecule that would otherwise be suitable to have a substituent.

As used herein, "substituted" includes a molecule having a substituent other than hydrogen that is bonded to a carbon atom or nitrogen atom.

As used herein, "layer" includes a material that at least partially covers a surface and has a thickness.

While the foregoing is directed to aspects of the present disclosure, other and further aspects of the present disclosure may be devised without departing from the basic scope thereof. Furthermore, while the foregoing is directed to polymers, materials, and methods as applied to the aerospace industry, aspects of the present disclosure may be directed to other applications not associated with an aircraft, such as applications in the automotive industry, marine industry, energy industry, wind turbines, and the like.

What is claimed is:

1. An airfoil, comprising:
   a root section;
   an intermediate section coupled with the root section;
   a tip section coupled with the intermediate section; and
   a layer disposed on the root section, the intermediate section, the tip section, or combination(s) thereof, the layer comprising:
      a carbon allotrope material, and
      an electrically conductive material disposed on the carbon allotrope material, the electrically conductive material comprising a polymer and a sulfonic acid.

2. The airfoil of claim 1, wherein the carbon allotrope material is a carbon allotrope material sheet.

3. The airfoil of claim 1, further comprising a wear-resistant material layer adjacent the layer comprising the carbon allotrope material and the electrically conductive material.

4. The airfoil of claim 3, wherein the wear-resistant material is selected from the group consisting of nickel, titanium, and combination(s) thereof.

5. The airfoil of claim 1, wherein the carbon allotrope material is selected from the group consisting of a multi-walled carbon nanotube, a single-walled carbon nanotube, a graphene, a polycarbonate, a fullerene, or combination(s) thereof.

6. The airfoil of claim 1, wherein the sulfonic acid is selected from the group consisting of a naphthyl sulfonic acid, an anthracenyl sulfonic acid, a pyrenyl sulfonic acid, and combination(s) thereof.

7. The airfoil of claim 1, wherein the polymer is selected from the group consisting of a polyaniline, a poly(ethylenedioxythiophene), a poly(styrenesulfonate), and combination(s) thereof.

8. The airfoil of claim 7, wherein the layer further comprises a second polymer.

9. The airfoil of claim 8, wherein the second polymer is selected from the group consisting of a polyurethane, a polyvinyl butyral, a polyacrylate, an epoxy, a glycidyl-Si-Zr-containing solgel, a polyester, a phenoxy resin, a polysulfide, and combination(s) thereof.

10. The airfoil of claim 7, wherein the second polymer is disposed on the first polymer.

11. The airfoil of claim 1, wherein the first polymer is a poly(ethylenedioxythiophene) and the layer further comprises a poly(styrenesulfonate).

12. The airfoil of claim 1, wherein the layer has a thickness of about 0.1 pm to about 10 μm.

13. An airfoil, comprising:
a spar; and
a layer disposed on the spar, the layer comprising:
  a carbon allotrope material, and
  an electrically conductive material disposed on the carbon allotrope material, the electrically conductive material comprising a polymer and a sulfonic acid.

14. The airfoil of claim 13, wherein the carbon allotrope material is a carbon allotrope material sheet.

15. The airfoil of claim 13, further comprising a wear-resistant material layer adjacent the layer comprising the carbon allotrope material and the electrically conductive material.

16. The airfoil of claim 15, wherein the wear-resistant material is selected from the group consisting of nickel, titanium, and combination(s) thereof.

17. The airfoil of claim 13, wherein the carbon allotrope material is selected from the group consisting of a multi-walled carbon nanotube, a single-walled carbon nanotube, a graphene, a polycarbonate, a fullerene, or combination(s) thereof.

18. The airfoil of claim 13, wherein the sulfonic acid is selected from the group consisting of a naphthyl sulfonic acid, an anthracenyl sulfonic acid, a pyrenyl sulfonic acid, and combination(s) thereof.

19. The airfoil of claim 13, wherein the polymer is selected from the group consisting of a polyaniline, a poly(ethylenedioxythiophene), a poly(styrenesulfonate), and combination(s) thereof.

20. The airfoil of claim 19, wherein the layer further comprises a second polymer selected from the group consisting of a polyurethane, a polyvinyl butyral, a polyacrylate, an epoxy, a glycidyl-Si-Zr-containing solgel, a polyester, a phenoxy resin, a polysulfide, and combination(s) thereof.

* * * * *